US005663763A

United States Patent [19]

Yagasaki et al.

[11] Patent Number: 5,663,763

[45] Date of Patent: Sep. 2, 1997

[54] PICTURE SIGNAL ENCODING METHOD AND APPARATUS AND PICTURE SIGNAL DECODING METHOD AND APPARATUS

[75] Inventors: Yoichi Yagasaki; Tohru Wada; Katsumi Tahara, all of Kanagawa, Japan

[73] Assignee: Sony Corp., Tokyo, Japan

[21] Appl. No.: 137,257

[22] Filed: Oct. 18, 1993

[30] Foreign Application Priority Data

| | | | |
|---|---|---|---|
| Oct. 29, 1992 | [JP] | Japan | 4-291697 |
| Jan. 25, 1993 | [JP] | Japan | 5-010177 |
| Mar. 25, 1993 | [JP] | Japan | 5-066550 |

[51] Int. Cl.$^{6}$ ........ H04N 7/24

[52] U.S. Cl. ........ 348/405; 348/27; 382/251

[58] Field of Search ........ 348/405, 384, 348/409, 412, 408, 415, 419, 400, 411, 27; 382/251; H04N 7/137

[56] References Cited

U.S. PATENT DOCUMENTS

| | | | |
|---|---|---|---|
| 3,707,680 | 12/1972 | Gabbard et al. | 348/415 |
| 4,179,710 | 12/1979 | Ishiguro et al. | 348/419 |
| 4,467,346 | 8/1984 | Mori | 348/409 |
| 4,698,672 | 10/1987 | Chen et al. | 348/415 |
| 4,725,885 | 2/1988 | Gonzales et al. | 348/411 |
| 4,734,767 | 3/1988 | Kaneko et al. | 348/400 |
| 4,746,978 | 5/1988 | Shimura | 348/405 |
| 4,785,356 | 11/1988 | Gonzales et al. | 348/409 |
| 4,791,483 | 12/1988 | Miller | 348/384 |
| 4,885,637 | 12/1989 | Shikakura et al. | 348/409 |
| 4,992,889 | 2/1991 | Yamagami et al. | 348/415 |
| 5,006,931 | 4/1991 | Shirota | 348/408 |
| 5,010,402 | 4/1991 | Nishino | 348/405 |
| 5,089,888 | 2/1992 | Zdepski et al. | 348/405 |
| 5,191,422 | 3/1993 | Cho et al. | 348/418 |
| 5,301,032 | 4/1994 | Hong et al. | 348/384 |
| 5,301,040 | 4/1994 | Hoshi et al. | 348/384 |
| 5,323,187 | 6/1994 | Park | 348/405 |
| 5,374,958 | 12/1994 | Yanagihara | 348/405 |

FOREIGN PATENT DOCUMENTS

| | | |
|---|---|---|
| 0 424 060 | 4/1991 | European Pat. Off. . |

OTHER PUBLICATIONS

Signal Processing. Image Communication, vol. 4, No. 2, Apr. 1992, Amsterdam NL pp. 129–140 Le Gall 'The MPEG video compression algorithm' p. 131, col. 2–p. 139, col. 1, line 18; figures 1–6.

Signal Processing. Image Communication, vol. 2, No. 2, Aug. 1990, Amsterdam NL pp. 145–154 Gonzales et al. 'DCT Coding for Motion Video Storage Using Adaptive Arithmetic Coding' p. 146, col. 1, line 31–p. 152, col. 1, line 29; figures 1–3.

*Primary Examiner*—Tommy P. Chin
*Assistant Examiner*—Richard Lee
*Attorney, Agent, or Firm*—William S. Frommer; Alvin Sinderbrand

[57] ABSTRACT

An encoding and decoding apparatus and method which has the primary benefit over the prior art of not requiring storage of the nonlinear sequence of numbers representative of the quantization characteristics. The hardware required for quantization is reduced and inverse quantization may be achieved using shifting operations and a multiplier of up to half the scale compared to conventional encoding/decoding methods and encoding/decoding apparatus.

13 Claims, 19 Drawing Sheets

FIELD PREDICTION MODE

FRAME PREDICTION MODE

FIELD DCT MODE

FRAME DCT MODE

PICTURE SIGNAL ENCODING METHOD AND APPARATUS AND PICTURE SIGNAL DECODING METHOD AND APPARATUS

DETAILED DESCRIPTION OF THE INVENTION

1. Field of the Invention

This invention relates to a method for quantization and inverse quantization of picture data using a recording medium for storage, such as an optical disc or a magnetic tape, an apparatus for recording/reproducing the information using such a recording medium for storage, and an apparatus for transmitting/receiving the information which may be suitably applied to a so-called teleconferencing system, a moving-picture telephone system or a broadcasting system.

2. Background of the Invention

Recently, in a so-called signal transmission system for transmitting video and voice signals to a remote place, such as a teleconferencing system or a television telephone system, it has been a customary practice to make efficient use of the transmission channel by encoding the video or voice signals for improving the information transmission efficiency.

For moving picture data, having an extremely large quantity of the information, above all, there must be provided means for recording picture signals with high efficiency encoding and for decoding the recorded signals with high efficiency when reading out the recorded signals. Therefore, a number of high efficiency encoding systems have been proposed which take advantage of the correlation of picture signals. Among these high efficiency encoding systems, there is the MPEG (Moving Picture Experts Group) system.

With the MPEG system, the difference between picture frames of picture signals is taken for reducing the redundancy along the time scale by taking advantage of the correlation between frames combined with subsequent processing by discrete cosine transform (DCT) for reducing the redundancy along the spatial scale by taking advantage of line correlation for achieving high efficiency encoding of the picture signals.

In utilizing the correlation between frames, if frame pictures PC1, PC2 and PC3 are generated at timings $t=t_1$, $t_2$ and $t_3$, respectively, as shown at (A) in FIG. 9, a picture PC12 may be generated by taking the difference between the picture signals of the frame pictures PC1 and PC2, as shown at (B) in FIG. 9, while a picture PC23 may be generated by taking the difference between the picture signals of the frame pictures PC2 and PC3, as shown at (B) in FIG. 9. Since the frame pictures temporally adjacent to each other usually are not changed significantly from each other, the difference between these two frame pictures is of a smaller value.

That is, with the picture PC12, shown at (B) in FIG. 9, difference signals representing the hatched portion of the picture PC12 shown at (B) in FIG. 9 are produced as the difference between the picture signal of the frame pictures PC1 and PC2, shown at (A) in FIG. 9, while difference signals representing the hatched portion of the picture PC23 shown at (B) in FIG. 9 are produced as the difference between the picture signal of the frame pictures PC2 and PC3, shown at (A) in FIG. 9. The encoding volume may be compressed by encoding these difference signals.

However, the original picture cannot be restored by transmitting only the difference signals. Consequently, in compression encoding the picture signals, the frame pictures are classed into intra-coded pictures or I-pictures, predictive-coded pictures or P-pictures and bidirectionally predictive-coded pictures or B-pictures.

For example, at (A) and (B) in FIG. 10, 17 frame picture signals of a frame F1 to a frame F17 are grouped together as a group of pictures, which is a processing unit. The leading frame F1 is encoded as the I-picture, while the second frame F2 and the third frame F3 are processed as the B-picture and the P-picture, respectively. The frames F4 up to F17 are processed alternately as the B-pictures and as the P-pictures, so that F4 is a B-Picture and F5 is a P-Picture, etc.

As for the picture signals of the I-picture, the one-frame picture signals are transmitted in their entirety. On the other hand, as for the picture signals for the B-picture, a difference between mean values of the picture signals of a temporally proceeding frame and mean value of the picture signals of a temporally succeeding frame is found and encoded for transmission, as shown at (B) in FIG. 10.

FIGS. 11 (A) and (B) illustrate the principle of the method for encoding the moving picture signals, as described above. Thus, FIGS. 11(A) and (B) illustrate frame data of the moving picture signals and the transmission frame data, respectively. Referring to FIG. 11, since the first frame F1 is processed as the I-picture, that is as the non-interpolated frame, this frame F1 is directly transmitted on the transmission channel as transmission data F1X (non-interpolated transmission frame data). On the other hand, since the second frame F2 is processed as a B-picture, that is as an interpolated frame, the difference between mean values of the temporally succeeding frame F3 and the temporally preceding frame F1 is taken and transmitted as the transmission data (interpolated transmission frame data).

Specifically, the B-picture is processed in four different modes. The first processing mode consists in directly transmitting the data of the original frame F2 as the transmission data F2X, as shown by a broken-line arrow SP1 (intra-coding). The processing mode is similar to that for the I-picture. The second processing mode consists in taking a difference between the frame F2 and the temporally succeeding frame F3 and transmitting the difference as indicated by a broken-line arrow SP2 in FIG. 11 (forward predictive coding). The third processing mode consists in taking a difference between the frame F2 and the temporally preceding frame F1 and transmitting the difference as indicated by a broken-line arrow SP3 in FIG. 11 (backward predictive coding). The fourth processing mode consists in taking a difference between the temporally preceding frame F1 and the temporally succeeding frame F3 and transmitting the difference as transmission data F2X as indicated by a broken-line arrow SP4 in FIG. 11 (bidirectionally predictive coding).

Of these four methods, the method which yields the least amount of transmission data is employed.

It is noted that, when transmitting the difference data, a motion vector x1 between the reference frame (frame under consideration) and the prediction picture (picture produced by calculating the difference from the reference frame), that is a motion vector x1 between the frames F1 and F2 for forward predictive coding, a motion vector x2, that is a motion vector between the frames F2 and F3 for backward predictive coding, or both the motion vectors x1 and x2 for bidirectionally predictive-coding, are transmitted along with the difference data.

As for the frame F3, processed as a P-picture, difference signals between the frame F3 and the temporally preceding frame F1 are taken and transmitted as indicated by a broken-line arrow SP3 and a motion vector x3 is calculated and transmitted as the transmission data F3X (forward prediction-coding). Alternatively, data of the original frame F3 is directly transmitted as transmission data F3X, as indicated by a broken-line arrow SP1. The P-picture which is represented by a smaller amount of transmission data is selected for transmission as in the case of the B-picture mentioned above.

Meanwhile, the frame F4, as a B-picture, and the frame F5, as a P-picture, are processed in the same respective manner as above for producing transmission data F4X, F5X and motion vectors x4, x5 and x6.

FIG. 12 illustrates another example of inter-frame encoding and intra-frame encoding of a picture sequence. In this figure, a cycle of 15 frames represents an encoding unit.

It is noted that frame 2 is an I-picture, while frames 5, 8, 11 and 14 are P-pictures coded by inter-frame coding, with the prediction being made only from the forward direction, and frames 0, 1, 3, 4, 6, 7, 9, 10, 12 and 13 are B-pictures coded by inter-frame coding, with prediction being made from both the backward and forward directions.

The inputting, encoding, decoding and outputting (display) sequences for the above-described intra/inter-frame encoding are illustrated in FIG. 13.

FIG. 14 illustrates an example of the construction of an apparatus for encoding, transmitting and decoding the moving picture signals based on the above-described principle. The encoding apparatus 1 encodes the input picture signals and transmits the encoded signals to a recording medium 3 for recording thereon. A decoding apparatus 2 reproduces, decodes and outputs signals recorded on the recording medium 3.

In the decoding device 1, video signals VD are entered via an input terminal 10 to a preprocessing circuit 11 and separated into luminance signals and chrominance signals. The luminance signals and the chrominance signals are separately converted to digital signals by the analog-to-digital (A/D) converters 12, 13. The digitized picture signals from the A/D converters 12, 13 are transmitted to and stored in a frame memory 14. In the frame memory 14, the luminance signals and the chrominance signals are stored in a luminance signal frame memory 15 and chrominance signal frame memory 16, respectively.

A format converting circuit 17 translates frame format signals stored in the frame memory 14 into block format signals. The video signals stored in the frame memory 14 are frame format signals consisting of V lines each consisting of H dots, as shown at (A) in FIG. 15. The format converting circuit 17 divides each frame signal into N slices each consisting of 16 lines. Each slice is divided into M macroblocks, as shown at B in FIG. 15. Each macroblock is made up of luminance signals corresponding to 16×16 pixels or dots, which are further divided into blocks Y[1] to Y[4], each consisting of 8×8 dots, as shown at (C) in FIG. 15. The 16×16 dot luminance signals are associated with the chrominance signals stored as 8×8 dot Cb signals and 8×8 dot Cr signals.

The moving picture signals within the slices shown at (A) in FIG. 15 are arrayed so that moving picture signals represent continuous signals on the basis of the macroblocks shown at (C) in FIG. 15 and the moving picture signals within each of the macroblocks also represent continuous block-based signals in the raster scanning sequence.

The data thus converted into block format data is supplied from the format converting circuit 17 to an encoder 18 and encoded in a manner which will be explained in more detail later by referring to FIG. 16.

The signals encoded by the encoder 18 are outputted as a bit stream to the transmission channel enabling them to be recorded, on say recording medium 3. The data reproduced from the recording medium 3 is supplied to a decoder 31 of the decoding device 2 so as to be decoded in a manner which will be explained later in more detail by referring to FIG. 19.

The data decoded by the decoder 31 is entered to a format converting circuit 32 and thereby converted from the block format data into the above-mentioned frame format data. The luminance signals of the frame format are transmitted to and stored in a luminance signal frame memory 34 of a frame memory 33 and the chrominance signals are transmitted to and stored in a chrominance signal frame memory 35. The luminance signals and the chrominance signals read out from the frame memory 33 are separately converted to analog form by the digital-to-analog converters (D/A converters) 36, 37. The resulting analog signals are transmitted to a post-processing circuit 38 so as to be synthesized into output picture signals which are outputted at an output terminal 30 for display on a display device, such as CRT.

Referring to FIG. 16, the construction of the encoder 18 is explained.

The picture data supplied via an input terminal 49 is entered on the macroblock basis to a motion vector detecting circuit 50 which is adapted for processing the picture data of the respective frames. The respective input frame pictures are processed as the I picture, the P-picture or as the B-picture in a pre-set manner. For example, the group of pictures constituted by the frames F1 to F17 shown in FIG. 10 is processed in the sequence of I, B, P, B, P, . . . B, P, as shown therein.

The picture data of the frame to be processed as the I-picture, for example, the frame F1, is transmitted from the motion vector detection circuit 50 to a forward original picture section 51*a* of a frame memory 51 for storage therein, while the picture data of the frame to be processed as the B-picture, for example, the frame F2, is transmitted to and stored in a reference original picture section 51*b* of the frame memory 51 and the picture data of the frame to be processed as the P-picture, for example, the frame F3, is transmitted to and stored in a backward original picture section 51*c* of the frame memory 51.

At the next timing when the picture of a frame to be processed as the B-picture such as the frame F4 or the picture of a frame to be processed as P-picture such as the frame F5 is entered, the picture data of the first P-picture, currently stored in the backward original picture section 51*c*, that is the frame F3, is transferred to the forward original picture section 51*a*, and the picture of the next B-picture, that is the frame F4, is stored (or overwritten) in the reference original picture section 51*b*, while the picture data of the next P-picture, that is the frame F5, is stored (or overwritten) in the backward original picture section 51*c*. The sequence of the operations is repeated sequentially.

The signals of the respective pictures, stored in the frame memory 51, are read out and transmitted to a prediction mode changeover circuit 52 in which the frame prediction mode operation or the field prediction mode operation is carried out. Then, in a processing section 53, the intra-coding, forward predictive coding, backward predictive coding or bidirectional predictive coding operations are carried out under control of a prediction decision circuit 54. The signal determining which of these operations is to be carried out is based on prediction error signals, that is the difference between the reference picture (picture under consideration), and the prediction picture. Consequently, the motion vector detection circuit 50 generates the sum of absolute or squared values of the prediction error signals employed for that decision.

The frame prediction mode and the field prediction mode in the prediction mode switching circuit 52 is explained below.

If the frame prediction mode is set in the prediction mode changeover circuit 52, the prediction mode switching circuit 52 directly outputs the four luminance blocks Y[1] to Y[4] supplied from the motion vector detection circuit 50 to a downstream side processing unit 53. In such case, as shown at (A) in FIG. 17, the odd-field line data and the even-field line data coexist in each luminance block. In FIG. 17, solid lines and broken lines in each macroblock represent odd-field line data (first field line data) and even-field line data (second field line data), respectively, while a and b represent units of motion compensation. In the frame prediction mode, prediction is performed based on the four luminance blocks (macroblocks) and a motion vector associated with the four luminance blocks.

If the field prediction mode is set in the prediction mode changeover circuit 52, the signals entered in the array shown at (A) in FIG. 17 from the motion vector detection circuit 50 are constructed so that the luminance blocks Y[1] and Y[2] are composed only of odd-field line data while the remaining two luminance blocks Y[3] and Y[4] are composed only of even-field line data, as shown at (B) in FIG. 17. These luminance blocks Y[1] to Y[4] are outputted to the processing section 53. In such case, a motion vector is associated with the two luminance blocks Y[1] and Y[2], while another motion vector is associated with the other two luminance blocks Y[3] and Y[4].

Referring further to FIG. 16, the motion vector detection circuit 50 outputs the sum of absolute values of the prediction errors for the frame prediction mode and the sum of absolute values of the prediction errors for the field prediction mode to the prediction mode changeover circuit 52. The changeover circuit 52 compares the sums of the absolute values of the prediction errors for the frame prediction mode and the field prediction mode to each other to indicate that the prediction mode having the lesser value of the sum is to be performed to output the resulting data to the processing section 53.

Corresponding operations are carried out by the motion vector detection circuit 50. The motion vector detection circuit 50 outputs signals having the configuration to select a mode in the prediction mode changeover circuit 52. The prediction mode changeover circuit 52 directly outputs the signals to the downstream processing section 53.

For the frame prediction mode, the chrominance signals are supplied to the processing unit 53 in a state in which the odd-line field data coexist with the even-line field data, as shown at (A) in FIG. 17. For the field prediction mode, the upper half of the chrominance blocks Cb[5] and Cr[6] are the odd-field chrominance signals associated with the luminance blocks Y[1] and Y[2], respectively, while the lower half of the chrominance blocks Cb[5] and Cr[6] are the even-field chrominance signals associated with the luminance blocks Y[3] and Y[4], respectively, as shown at (B) in FIG. 17.

The prediction decision circuit 54 outputs a signal which determines how the motion vector detection circuit 50 will generate the sum of the absolute values of the prediction errors used to determine which type of coding will be performed. Either intra-coding, forward predictive coding, backward predictive coding or bidirectional predictive coding will be selected.

For intra-coding, the sum of the absolute values of the prediction error is found by comparing the difference between an absolute value $|\Sigma Aij|$ of the sum $\Sigma Aij$ of the signals Aij of a macroblock of a reference picture and the sum of the absolute values $\Sigma|Aij|$ of the absolute values $|Aij|$ of the signals Aij of the macroblock. For forward prediction, the sum of the absolute values of the prediction error signals is found by comparing the sum $\Sigma|Aij-Bij|$ of absolute values $|Aij-Bij|$ of the differences (Aij−Bij) between the signals Aij of the macroblock of the reference picture and the signals Bij of the macroblock of the prediction picture. The sum of absolute values of the prediction errors for the backward prediction and that for the bidirectional predictive coding are also found similarly to the sum of absolute values of the prediction errors for the forward prediction. However, the latter two types of predictive coding use different predictive pictures than those used for forward prediction.

These sum values are supplied to the prediction decision circuit 54 which selects the least sum value, of the sums of the absolute values of the prediction errors of the forward predictive coding, backward predictive coding and the bidirectional predictive coding, as the sum of the absolute values of the prediction errors of the inter-prediction. The prediction decision circuit 54 selects, by comparison, the smaller of the sum of the absolute values of the prediction errors for the inter-prediction and the sum of the absolute values of the prediction errors for the intra-coding and selects the mode corresponding to the selected sum of the absolute values as the prediction mode. If the sum of the absolute values of the prediction errors for the intra-coding has the smaller value, the intra-picture prediction mode is set. If the sum of the absolute values of the prediction errors for the inter-coding has the smaller value, the selected one of the forward predictive mode, the backward predictive mode and the bidirectional predictive mode having the smallest value is sent.

Thus, the motion vector detection circuit 50 supplies the signals of the macroblock of the reference picture to the processing section 53 via the prediction mode changeover circuit 52, in the configuration corresponding to the frame prediction mode or the field prediction mode as selected by the prediction mode changeover circuit 52. The motion vector detection circuit 50 also detects the motion vector between the prediction picture and the reference picture associated with the prediction mode selected by the prediction decision circuit 54 and outputs the detected motion vector to the variable length coding circuit 58 and the motion compensation circuit 64 as later explained. The motion vector which will give the smallest value of the sum of the absolute values of the corresponding prediction errors is the one selected.

When the motion vector detection circuit 50 reads out the picture data of the I-picture from the forward original picture section 51*a*, the prediction decision circuit 54 sets the intra-frame (intra-picture) prediction mode, that is the mode in which motion compensation is not carried out, and causes a switch of the processing section 53 be set to a fixed contact a. Thus the picture data of the I-picture is entered to a DCT changeover circuit 55.

The DCT mode changeover circuit 55 sets the data of the four luminance blocks to the state in which the odd-field line data coexist with the even-field line data (frame DCT mode) or to the state in which the odd-field line data are separated from the even-field line data (field DCT mode), as shown at (A) or (B) in FIG. 18, and outputs the data in one of these states to a DCT circuit 56. The DCT mode changeover circuit 55 compares the coding efficiency which is achieved when the DCT operation is performed on the odd-field data coexisting with the even-field data to the coding efficiency which is achieved when the DCT operation is performed on the odd-field data and the even-field data separated from each other and selects the mode having the higher coding efficiency.

The input signals are first set to a configuration in which the odd-field line data co-exists with the even-field line data, as shown at (A) in FIG. 18. The differences between the odd-field line signals and the even-field line signals vertically adjacent to one another are calculated, and the sum of the absolute values or the squared values of the differences is found. The input signals are then set to the configuration in which the odd-field line data are separated from the even-field line data, as shown at (B) in FIG. 18. And the differences between the vertically adjacent odd-field line data and the differences between the vertically adjacent even field line data are calculated and the sum of the absolute values or squared values is found. The DCT mode switching circuit 55 compares these sums and sets the mode to either the frame DCT mode or the field DCT mode depending if the former sum value or the latter sum value is smaller, respectively. The data having the configuration associated with the selected DCT mode is outputted to the DCT circuit 56, while a DCT flag indicating the selected DCT mode is outputted to a VLC circuit 58 and to a motion compensation circuit 64.

The comparison between the predictive mode shown in FIG. 17 in the predictive mode changeover circuit 52 and the DCT mode shown in FIG. 18 in the DCT mode changeover circuit 55 reveals that the data structures of the luminance blocks are the same in the respective modes.

If the frame prediction mode, the mode in which the odd lines co-exist with the even lines, is selected in the prediction mode changeover circuit 52, the probability is high that the frame DCT mode, the mode in which the odd lines coexist with the even lines, is also selected in the DCT mode changeover circuit 55. Whereas, if the field prediction mode, the mode in which the odd lines are separated from the even lines, is selected in the prediction mode changeover circuit 52, the probability is high that the field DCT mode, the mode in which the odd line data is separated from the even line data, is also selected in the DCT mode changeover circuit 55.

However, this is not necessarily the case, and the prediction mode is set in the prediction mode changeover circuit 52 so that the sum of the absolute values of the differences is smaller, while the DCT mode is set in the DCT mode changeover circuit 55 so that the coding efficiency is more favorable.

The I-picture data outputted from the DCT mode changeover circuit 55 is entered to the DCT circuit 56 where it is processed with discrete cosine transform (DCT) so as to be transformed into DCT coefficients. These DCT coefficients are entered to a quantizing circuit 57, so as to be quantized at the quantization step corresponding to the amount of data stored in a downstream side buffer 59, before being entered to a variable length coding circuit 58.

The variable length coding circuit (VLC circuit) 58 translates the picture data, herein the I-picture data, supplied from the guantizing circuit 57, into data of the variable length codes, such as the Huffman code, in association with the quantization step (quantization scale) supplied from the quantizing circuit 57, to transmit the variable length code data to a transmission buffer 59. The variable length coding circuit 58 is also supplied with the quantization step (quantization scale) from the quantization circuit 57, the prediction mode from the prediction decision circuit 54 (the mode indicating which of the intra-picture coding, forward predictive coding, backward predictive coding or the bidirectional predictive coding has been set), the motion vector from the motion vector detection circuit 50, the prediction flag from the prediction mode changeover circuit 52 (a flag indicating which of the frame prediction mode or the field prediction mode has been set), and a DCT flag (a flag indicating which of the frame DCT mode and the field DCT mode has been set). The VLC circuit converts these data or flags into corresponding variable length coded data.

The transmission buffer 59 transiently stores the data corresponding to the amount of stored data in the quantizing circuit 57. When the residual data amount in the transmission buffer 59 is increased up to an allowable upper limit, the transmission buffer 59 increments the quantization step in the quantizing circuit 57 with a quantization control signal to decrease the amount of the quantization data. Conversely, if the residual data quantity in the transmission buffer 59 is decreased up to an allowable lower limit, the transmission buffer 59 decrements the quantization step in the quantizing circuit 57 with a quantization control signal to increase the amount of the quantized data. In this manner, a data overflow or underflow will not occur in the transmission buffer 59. The data stored in the transmission buffer 59 is read out at a pre-set timing and outputted on the transmission channel via an output terminal 69 so as to be recorded on, for example, the recording medium 3. Data of the I-picture outputted from the quantization circuit 57 is also entered into the inverse quantization circuit 60 so as to be inverse quantized at the step supplied by the quantization circuit 57. An output of the inverse quantization circuit 60 is entered to an inverse DCT (IDCT) circuit 61 where inverse DCT is performed on the data.

It is noted that the prediction flag from the prediction mode changeover circuit 52 and the DCT flag from the DCT mode changeover circuit 55 are entered to a converting circuit 66. The prediction flag from the prediction mode changeover circuit 52 is also entered to a converting circuit 65. The data processed with an inverse DCT by the IDCT circuit 61 is transmitted via the converting circuits 65 and 66 and a processor 62 for data matching and subsequently transmitted to and stored in a forward prediction picture section 63*a* of a frame memory 63.

Meanwhile, when processing the frame picture data sequentially entered thereto as, for example, the pictures I, B, P, B, P, B, . . . , the motion vector detection circuit 50 first processes the initially entered frame picture data as the I-picture and, before processing the subsequently entered second frame picture as the B-picture, processes the third frame picture data as the P-picture. The order is inverted because the B-picture is based on backward prediction and hence cannot be decoded unless the P-picture as the backward predicted picture is available.

Thus the motion vector detection circuit 50 starts processing picture data of the P-picture stored in the backward original picture section 51*c*, immediately after processing the I-picture. The sum values of the absolute values of the macroblock based inter-frame differences (prediction errors) are transmitted from the motion vector detection circuit 50 to the prediction mode changeover circuit 52 and to the predictor decision circuit 54. The prediction mode changeover circuit 52 and the prediction decision circuit 54 set the prediction mode to one of the frame/field prediction mode and intra-picture prediction, forward prediction, backward prediction or bidirectional prediction in response to the value of the sums of the absolute values of the prediction errors of the macroblocks of the P-picture.

If the prediction mode is set to the intra-picture prediction mode, the switch in the processing section 53 is changed over to the fixed terminal a, as mentioned above. Thus the picture data of the P-picture is transmitted to the transmission channel via the DCT mode changeover circuit 55, DCT circuit 56, quantization circuit 57, variable length coding circuit 58 and a transmission buffer 59, similarly to the picture data of the I-picture. The picture data is also supplied to and stored in a backward prediction picture section 63*b* of the frame memory 63 via the inverse quantization circuit 60, IDCT circuit 61, a converting circuit 66, processor 62 and a converting circuit 65.

If the prediction mode is the forward prediction mode, the switch in the processing section 53 is changed over to the terminal b, at the same time that the picture data stored in the forward prediction picture section 63*a* in the frame memory 63, herein the picture data of the I-picture, is read out and motion-compensated by a motion compensation circuit 64, which is responsive to the motion vector outputted by the motion vector detection circuit 50. The motion compensation circuit 64, when commanded by the prediction decision circuit 54 to set the forward prediction mode, reads out the data, after it shifts the readout address of the forward prediction picture section 63*a* from a position corresponding to the macroblock position currently outputted by the motion vector detection circuit 50 by an amount corresponding to the motion vector for generating prediction picture data.

The prediction data outputted by the motion compensation circuit 64 is supplied to a processor 53*a* which then subtracts the macroblock based prediction picture data supplied from the motion compensation circuit 64 from data of the macroblock of the reference picture supplied from the prediction mode changeover circuit 52 to output the difference, which is the prediction error. The difference data is supplied via the DCT mode changeover circuit 55, DCT circuit 56, quantization circuit 57, VLC circuit 58 and transmission buffer 59 to the transmission channel via the output terminal 69. The difference data is also locally decoded by the inverse quantization circuit 60 and the IDCT circuit 61 so as to be entered via the converting circuit 66 to the processor 62.

The prediction flag from the prediction mode changeover circuit 52 and the DCT flag from the DCT mode changeover circuit 55 are supplied to the converting circuit 66 for matching an output of the IDCT circuit 61.

The processor 62 is also supplied with data which is the same as the prediction picture data supplied to the processor 53*a*. The processor 62 adds the output prediction picture data of the motion compensation circuit 64 to the output difference data of the IDCT circuit 61. In this manner, the picture data of the original I-picture is produced. The picture data of the P-picture is supplied to and stored in the backward prediction picture section 63*b* via the converting circuit 65.

After the data of the I-picture and the data of the P-picture is stored in the forward predictive-coded picture section 63*a* and the backward predictive-coded picture section 63*b*, respectively, the motion vector detection circuit 50 executes the processing of the B-picture. The prediction mode changeover circuit 52 sets the frame mode or the field mode, in response to the magnitude of the sum of the absolute values of the inter-frame difference on the macroblock basis. Simultaneously, the prediction decision circuit 54 sets the prediction mode to one of the intra-picture prediction mode, forward prediction mode, backward prediction mode or bidirectional prediction mode.

If the prediction mode is the intra-frame prediction mode or the forward prediction mode, the switch in the processing section 53 is changed over to the fixed contact a or b, respectively. At this time, the processing similar to that for the F-picture is performed for transmitting the data. On the other hand, if the backward prediction mode or the bidirectional prediction mode is set, the switch in the processing section 53 is set to the fixed terminal c or d, respectively.

For the backward prediction mode, for which the switch in the processing section 53 is set to the fixed terminal c, picture data stored in the backward predictive-coded picture section 63*b*, herein the picture data for the P-picture, is read out and motion-compensated by the motion compensation circuit 64, which responsive to a motion vector outputted by the motion vector detection circuit 50. The motion compensation circuit 64, when commanded by the prediction decision circuit 54 to set the backward prediction mode, reads out the data after it shifts the readout address of the backward predictive-coded picture section 63*b* by an amount corresponding to the motion vector for generating predictive-coded picture data from a position corresponding to the macroblock position currently outputted by the motion vector detection circuit 50.

The predictive-coded picture data outputted by the motion compensation circuit 64 is supplied to a processor 53*b* which then subtracts the predictive-coded picture data, supplied from the motion compensation circuit 64, from data of the macroblock of the reference picture, supplied from the prediction mode changeover circuit 52, to output the difference data which is supplied via the DCT mode changeover circuit 55, DCT circuit 56, quantization circuit 57, variable length coding circuit 58 and transmission buffer 59 to the transmission channel via the output terminal 69.

For the bidirectional prediction mode, for which the switch in the processing section 53 is set to the fixed terminal d, picture data stored in the forward predictive-coded picture section 63*a*, herein the picture data for the I-picture, and picture data stored in the backward predictive-coded picture section 63*b*, herein the picture data for the P-picture, are read out and motion-compensated by the motion compensation circuit 64, which is responsive to the motion vector outputted by the motion vector detection circuit 50. The motion compensation circuit 64, when commanded by the prediction decision circuit 54 to set the bidirectional prediction mode, reads out the data after it shifts the readout addresses of the forward predictive-coded picture section 63*a* and the backward predictive-coded picture section 63*b* from a position corresponding to the macroblock position currently outputted by the motion vector detection circuit 50 by amounts corresponding to the motion vectors for the forward and backward predictive-coded pictures for generating predictive-coded picture data.

The predictive-coded picture data outputted by the motion compensation circuit 64 is supplied to a processor 53*c* which then subtracts the mean value of the predictive-coded picture data, supplied from the motion compensation circuit 64, from the data of the macroblock of the reference picture, supplied from the motion vector detection circuit 50, to output the difference data which is transmitted via the DCT mode changeover circuit 55, DCT circuit 56, quantization circuit 57, VLC circuit 58 and transmission buffer 59 to the transmission channel via the output terminal 69.

Since the B-picture is not used as a prediction picture for other pictures, it is not stored in the frame memory 63.

The frame memory 63 may be so constructed that the forward predictive-coded picture section 63*a* and the backward predictive-coded picture section 63b can be bank-exchanged so that the picture stored in one or the other of the sections 63a, 63b is outputted as the forward predictive-coded picture or the backward predictive-coded picture for a given reference picture.

Although the foregoing description has been made mainly of the luminance blocks, the chrominance blocks are also processed on the basis of the macro-blocks shown in FIGS. 17 and 18 prior to transmission. The motion vector employed in processing the chrominance blocks is the motion vector of the associated luminance block reduced by ½ in the vertical and horizontal directions.

FIG. 19 shows, in a block diagram, a typical construction of the decoder 31 shown in FIG. 14. Picture data transmitted over the transmission channel, that is the recording medium 3, is received by a reception circuit, not shown, or reproduced by a reproducing circuit, also not shown, so as to be subsequently transiently stored via an input terminal 80 in a reception buffer 81. The picture data, thus stored transiently, is supplied to a variable length decoding circuit 82 of a decoding circuit 90. The variable length decoding circuit 82 then decodes the data supplied from the reception buffer 81 by variable length decoding and outputs the motion vector, prediction mode, prediction flag and the DCT flag to a motion compensation circuit 87, while outputting the quantization step data and decoded picture data to the inverse quantization circuit 83.

The inverse quantization circuit 83 inverse-quantizes the picture data supplied from the variable length decoding circuit 82 depending on the quantization step data supplied thereto to output the inverse-quantized data to an IDCT circuit 84. Output data from the inverse quantization circuit 83, that is the DCT coefficients, are processed by an inverse DCT in the IDCT circuit 84 so as to be supplied via a converting circuit 88 to a processor 85.

Picture data supplied from the IDCT circuit 84 is matched by the converting circuit 88 based on the prediction flags and the DCT flags supplied to the converting circuit 88.

If the picture data supplied to the processor 85 is the data of the I-picture, the data is outputted by the processor 85 so as to be supplied to and stored in the forward predictive-coded picture section 86a in the frame memory 86 via the converting circuit 89 for generating predictive-coded picture data for the B and P-pictures subsequently entered to the processor 85. The data is also outputted by a converting circuit 89 to the format converting circuit 32 shown in FIG. 14 via an output terminal 91.

If the picture data supplied to the processor 85 is the data of the forward prediction mode and is the data of the P-picture having the picture data of an immediately previous frame as the predictive-coded picture data, then picture data (I-picture data) of the immediately previous frame, stored in a forward predictive-coded picture section 86a of a frame memory 86, is read out an motion-compensated by the motion compensation circuit 87 depending on the motion vector outputted from the variable length decoding circuit 82. The motion-compensated data is summed in the processor 85 to the picture data supplied from the IDCT circuit 84 (the difference data) and the resulting sum data is outputted. The sum data, that is the data of the decoded P-picture, is supplied to and stored in a backward predictive-coded picture section 86b within the frame memory 86 via the converting circuit 89 for generating the prediction picture data for the picture data subsequently entered to the processor 85, that is the B- or P-picture data.

If the data is the P-picture data and is intra-picture prediction mode data, the data is not processed in the processor 85, as with the I-picture data, instead it is directly transmitted to and stored as the backward predictive-coded picture section 86b via the converting circuit 89. Since the P-picture is the picture to be displayed next to the following B-picture, it is not as yet outputted to the format converting circuit 32 at this time. As mentioned previously, the P-picture entered after the B-picture is processed and transmitted prior to the B-picture by the coding circuit.

If the picture data supplied from the IDCT circuit 84 is the B-picture data, the picture data of the I-picture stored in the forward predictive-coded picture section 86a, the picture data of the P-picture stored in the backward predictive-coded picture section 86b, or both the I-picture and P-picture data is read out in response to the predictive mode supplied by the variable length decoding circuit 82, and motion-compensated by the motion compensation circuit 87 depending on the motion vector outputted by the variable length decoding circuit 82 for generating the predictive-coded picture. Such predictive-coded picture is not generated if no motion compensation is required, as in the intra-picture prediction mode.

The data motion-compensated in this manner by the motion compensation circuit 87 is summed in the processor 85 to an output of the converting circuit 88. This summed output is transmitted via the converting circuit 89 and the output 91 to the format converting circuit 32 shown in FIG. 14. Since the sum output is the B-picture which data is not utilized for generating a prediction picture, it is not stored in the frame memory 86.

After the outputting of the B-picture, the picture data of the P-picture stored in the backward prediction picture section 86b is read out and transmitted via the motion compensation circuit 87 to the processor 85. Motion compensation is not performed at this time.

In the present decoder 31, the circuits corresponding to the prediction mode changeover circuit 52 and the DCT mode changeover circuit 55 in the encoder shown in FIG. 16 are not shown. The processing operation performed by these circuits, that is the operations of reverting the configuration having odd field line signals and even field line signals separated from one another to the original configuration having these signals mixed with one another, is executed by the motion compensation circuit 87.

Although the processing of luminance signals has been explained in the foregoing, processing of the chrominance signals is executed in a similar manner, except that the motion vector employed for the luminance signals is reduced by one half in each of the vertical and horizontal directions for use with the chrominance signals.

In executing quantization and inverse quantization in the encoding of picture signals, it is a routine practice to employ a value indicating the fineness of quantization, that is the width of quantization, or the quantization stepsize. Even numbers of from 2 to 62 are used to represent the width of quantization. The width of quantization is expressed by the quantization characteristics (QUANT). Integers from 1 to 31 are employed for expressing the quantization characteristics, which indicate the stepsize. The width of quantization is a value twice the value of the quantization characteristic.

The width of quantization is required for compressing a picture in general to a target data volume. It is however extremely difficult to compress a picture having statistic properties which deviate significantly from those of a general picture using the above-mentioned stepsizes. For example, a picture exhibiting extremely low pixel correlation or a picture approximated to white noise cannot be compressed by DCT encoding, which takes advantage of coefficient concentration in the frequency domain, to a target size even if the maximum value 31 of the quantization, characteristics is employed.

Another problem with the above described process, if it is desired to obtain a picture of extremely high picture quality, such a picture substantially free from distortion, known as a loss-less picture, then even the minimum value 1 of the quantization characteristics is too-large to perform quantization so as to restore the picture accurately.

At this time, in a usual linear quantizer, the above-mentioned quantization characteristics are inversely proportionate to or, more accurately, logarithmically related to the number of bits of the quantized picture data generated on the basis of the above-mentioned quantization characteristics. If the quantization characteristics, within such a small range of values, are changed by one, the number of bits generated changes significantly. If the quantization characteristics are changed from 1 to 2, the number of the bits generated is reduced substantially by one half. Thus, if the quantization characteristics are limited to a small range, the interval between neighboring values of the quantization characteristics is so broad as to render it difficult to finely control the number of bits generated.

Conversely, if the quantization characteristics are in the higher end of the range, the number of bits generated is scarcely changed when the quantization characteristics are changed by one. If the quantization characteristics are changed from 30 to 31, the number of bits generated does not changed by more than 5%. This indicates that the interval between neighboring values of these quantization characteristics is unnecessarily narrow in the higher range of the quantization characteristic values.

For overcoming the above-mentioned difficulties, there is known a method of mapping the quantization characteristics to a non-linear sequence of numbers instead of employing a sequence of numbers increased in a linear sequence from 1 to 31. The relation between the quantization information, for finding quantization characteristic mapped to such non-linear sequence of numbers, and quantization characteristics is shown in Table 7. The quantization information is termed an index number and incidentally expressed by numerical figures.

TABLE 7

| INDEX NUMBER | QUANTIZATION INFORMATION | QUANTIZATION CHARACTERISTICS (QUANT) | |
|---|---|---|---|
| | | DECIMAL EXPRESSION | BINARY EXPRESSION |
| 0 | 00000 | 1.0 | 0000001.0 |
| 1 | 00001 | 1.5 | 0000001.1 |
| 2 | 00010 | 2.0 | 0000010.0 |
| 3 | 00011 | 2.5 | 0000010.1 |
| 4 | 00100 | 3.0 | 0000011.0 |
| 5 | 00101 | 3.5 | 0000011.1 |
| 6 | 00110 | 4.0 | 0000100 |
| 7 | 00111 | 5.0 | 0000101 |
| 8 | 01000 | 6.0 | 0000110 |
| 9 | 01001 | 7.0 | 0000111 |
| 10 | 01010 | 8.0 | 0001000 |
| 11 | 01011 | 9.0 | 0001001 |
| 12 | 01100 | 11.0 | 0001011 |
| 13 | 01101 | 13.0 | 0001101 |
| 14 | 01110 | 15.0 | 0001111 |
| 15 | 01111 | 17.0 | 0010001 |
| 16 | 10000 | 19.0 | 0010011 |
| 17 | 10001 | 21.0 | 0010101 |
| 18 | 10010 | 23.0 | 0010111 |
| 19 | 10011 | 27.0 | 0011011 |
| 20 | 10100 | 31.0 | 0011111 |
| 21 | 10101 | 35.0 | 0100011 |
| 22 | 10110 | 39.0 | 0100111 |
| 23 | 10111 | 43.0 | 0101011 |
| 24 | 11000 | 47.0 | 0101111 |
| 25 | 11001 | 51.0 | 0110011 |
| 26 | 11010 | 55.0 | 0110111 |
| 27 | 11011 | 59.0 | 0111011 |
| 28 | 11100 | 67.0 | 1000011 |
| 29 | 11101 | 75.0 | 1001011 |
| 30 | 11110 | 83.0 | 1010011 |
| 31 | 11111 | 91.0 | 1011011 |

The above-mentioned problem due to the ranges of values of quantization characteristic may be overcome by employing quantization characteristics mapped to the non-linear sequence. But since the quantization characteristics are given as table values mapped to the non-linear sequence of numbers, it becomes necessary to provide an arrangement for storing the table values in the encoding/decoding apparatus. As a result thereof, the size of the hardware of the encoding/decoding apparatus is increased.

The construction of a conventional inverse quantizer making use of quantization characteristics of the non-linear sequence of numerals is shown schematically in FIG. 20. The quantization characteristics of the non-linear sequence of numbers are stored in a table 200, unusually implemented with a ROM, and read out from the table 200 on an 8-bit data line. The quantization characteristics are multiplied in a multiplier 201 by an n-bit conversion coefficient for the quantized picture data for inverse-quantizing the quantized data. A large circuit is required for both the table 200 and the multiplier 201 in the inverse guantizer.

With a conventional picture signal encoding/decoding apparatus, using non-linear quantization characteristics shown in Table 7 it is necessary to provide a multiplier for any inverse quantization necessary. The multiplier increases circuit size and thereby unnecessarily increases the size of the picture signal encoding/decoding apparatus.

In view of the above-depicted status of the art, it is an object of the present invention to provide a picture signal encoding method and apparatus and a picture signal decoding method and apparatus in which suitable quantization characteristics may be employed for quantization and inverse quantization of picture signals without increasing the circuit scale.

SUMMARY OF THE INVENTION

According to the present invention, there is provided an encoding method for picture signals in which input picture signals are quantized and subsequently encoded, comprising setting a value of the quantization information employed for expressing an index of powers of 2 as the first quantization information among the quantization information, setting a value corresponding to a coefficient multiplied by the powers of 2 as the second quantization information among the quantization information, and performing quantization based on the non-linear quantization characteristics (QUANT) expressed using a product of said coefficient and the powers of 2.

According to the present invention, there is also provided a picture signal decoding method in which transmitted encoded data is inverse-guantized and subsequently decoded for restoring the picture data, wherein, at the time of inverse quantization, the non-linear quantization characteristics are reproduced by multiplying powers of 2 by a coefficient to be multiplied by the powers of 2, using a value for expressing an index of the powers of 2 as the first quantization information among the quantization information and a value corresponding to the coefficient as the second quantization information.

In the above-described picture signal encoding or decoding method, it is preferred to find the quantization characteristics by using k as the first quantization information which is a value for expressing the index of the powers of 2, k being a positive integer, and by using (i/2+j) as the second quantization information corresponding to the coefficient multiplied by the powers of 2, j being a positive integer and i being 0 or 1, and to employ the quantization characteristics multiplied by a constant as the quantization stepsize.

The quantization characteristics (QUANT) are represented by an equation $$QUANT=(i/2+j)\times 2^{(k}+2^{k+2)}-4.$$

The quantization information, comprising the first quantization information and the second quantization information, is represented by five bits and the relation between the quantization information k, i and j and the quantization characteristics is set as shown in Table 1, 2, 3 or 4.

If the quantization characteristics are represented by a binary number, there exists at least one effective bit in four consecutive bits.

According to the present invention, there is also provided a method of inverse-quantizing the encoded data, wherein the encoded data is added thrice, and the resulting sum is shifted by the number of bits indicated by the first quantization information k.

The quantization characteristics are found by using m as the first quantization information which is a value for expressing the index of the powers of 2, m being a value (integer) required for expressing desired quantization characteristics, and by using $a_i$ as the second information corresponding to the coefficient multiplied by the powers of 2, $a_i$ being 0 or 1, i being an integer from 1 to n, and wherein the quantization characteristics multiplied by a constant are employed as the quantization stepsize.

The quantization characteristics QUANT are given by $$QUANT=2^{(m-1)}+a_1\times 2^{(m-2)}+a_2\times 2^{(m-3)}+\ldots a_n\times 2^{(m-n-1)}$$

wherein n is a preset integer representing the precision of the quantization characteristics.

If the number of bits required for expressing the range of values that may be assumed by the first quantization information m is L, the quantization information comprising the first quantization information and the second quantization information is represented by (L+n) bits.

The relation between the quantization information m, $a_i$ and the quantization characteristics is set as shown in the Tables 3 or 6.

In another aspect of the invention, when inverse-quantizing the encoded data, the encoded data is added twice and the resulting sum is shifted by three bits.

According to the present invention, there is also provided a picture signal encoding method in which a picture signals is encoded using a pre-set prediction picture signal, the resulting encoded signal is processed in a pre-set manner and subsequently quantized and in which the resulting quantized signal is variable length coded, wherein the amount of bits generated on linear quantization is evaluated. A linear/non-linear quantization changeover signal, indicating the quantization method, is generated based on the results of the evaluation. If the linear/non-linear quantization changeover signal indicates non-linear quantization, the quantization is performed based on non-linear quantization characteristics (QUANT) represented by powers of 2 and a coefficient multiplied by the powers of 2, with a value for expressing an index of the powers of 2 as the first quantization information among the quantization information and a value corresponding to said coefficient as the second quantization information.

The evaluation of the amount of the generated data is made on a frame basis.

According to the present invention, there is also provided a picture signal encoding apparatus in which an input picture signal is quantized and subsequently encoded, comprising an encoding unit for encoding the input picture signal using a pre-set prediction picture signal, a converting unit for performing a pre-set conversion processing operation on the signal encoded by said encoding unit, a quantization unit for quantizing an output signal of said converting unit based on the non-linear quantization characteristics (QUANT) represented by powers of 2 and a coefficient multiplied by the powers of 2, with a value for expressing an index of the powers of 2 as the first quantization information among the quantization information and a value corresponding to said coefficient as the second quantization information, and a variable length encoding unit for variable length encoding the quantized signal.

According to the present invention, there is also provided a picture signal encoding apparatus in which an input picture signal is guantized and subsequently encoded, comprising an encoding unit for encoding the input picture signal using a pre-set prediction picture signal, a converting unit for performing a pre-set conversion on the signal encoded by the encoding unit, an evaluating unit for evaluating the number of bits generated by linear quantization, a changeover signal generating unit for generating a linear/nonlinear changeover signal indicating the quantization method depending on the result of evaluation by the evaluating unit, a first quantization unit for performing linear quantization on signals from the converting unit based on the non-linear quantization characteristics (QUANT) represented by powers of 2 and a coefficient multiplied by the powers of 2, using a value for expressing an index of the powers of 2 as the first quantization information among the quantization information and a value corresponding to the coefficient as the second quantization information, if the linear/nonlinear changeover signal from said changeover signal generating unit indicates non-linear quantization.

The evaluating unit evaluates the number of bits generated on a frame basis.

If, in the picture signal decoding method according to the present invention, the linear/non-linear quantization changeover signal indicating which of the linear/non-linear quantization is to be used indicates non-linear quantization, the non-linear quantization characteristics are reproduced by multiplying powers of 2 by a coefficient to be multiplied by the powers of 2, using a value for expressing an index of the powers of 2 as the first quantization information among the quantization information and a value corresponding to said coefficient as the second quantization information, and the encoded data is inverse-quantized based on the reproduced non-linear quantization characteristics (QUANT).

With the linear/non-linear quantization changeover signal being changed over on the frame basis, the linear inverse quantization and non-linear inverse quantization are performed on the frame basis.

According to the present invention, there is also provided a picture signal decoding apparatus in which data obtained by variable length decoding the transmitted picture data is inverse-guantized and the inverse-quantized data is decoded for restoring picture data, comprising a variable length decoding unit for variable length decoding the transmitted picture data, an inverse quantization unit for reproducing the non-linear quantization characteristics by multiplying powers of 2 by a coefficient, using a value for expressing an index of the powers of 2 as the first quantization information among the quantization information, and a value corresponding to the coefficient to be multiplied by the powers of 2 as the second quantization information among the quantization information, and inverse-quantizing the quantized data based on reproduced quantization characteristics (QUANT), and a converting unit for performing a pre-set operation on the inverse-quantized data.

The inverse quantization unit comprises a table section for converting the first quantization information, shifting means for shifting the second quantization information based on the first quantization information, addition means for adding an output of a table to an output of the shifting means, and a multiplication section for multiplying the quantized data by an output of the addition means.

The inverse quantization unit comprises a table for converting the first quantization information, addition means for summing an output of the table to the second quantization information, multiplication means for multiplying an output of the addition means by the quantized data, and shifting means for shifting an output of the multiplication means by a number of bits as set by the first quantization information. The multiplication means is constituted by a three-stage multiplier.

The inverse quantization unit comprises a table for converting the first quantization information, addition means for summing an output of the table to the second quantization information, selecting means for selecting one of the output of the addition means and the linear quantization information depending on the linear/non-linear quantization information depending on the linear/non-linear quantization changeover signal decoded by the variable length decoding section and transmitted along with the picture data, multiplication means for multiplying an output of the selecting means and the quantized data, and shifting means for shifting an output of the multiplication means by bits as set by the first quantization information only when the linear/non-linear quantization changeover signal indicates non-linear quantization. The multiplication means is constituted by a three-stage multiplier.

EMBODIMENTS

Figure 1:
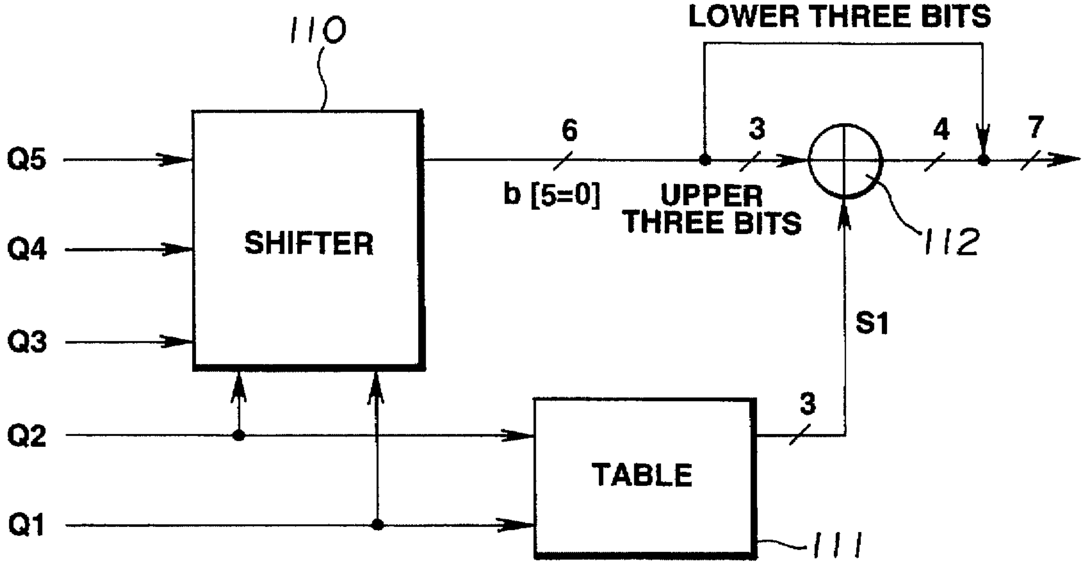
FIG. 1 illustrates a schematic arrangement of a circuit for reproducing quantization characteristics within an encoding apparatus and a decoding apparatus for picture signals according to the present invention.

Referring to the tables and drawings, the preferred embodiments of the present invention will be explained in detail.

With the first embodiment of the present invention, the binary numbers for expressing indices or exponents of powers of 2 in the quantization information represent the first quantization information, while the binary numbers corresponding to the coefficients to be multiplied by the values of the powers of 2 represent the second quantization information, and quantization or inverse quantization is carried out based on the quantization characteristics (QUANT) represented by the non-linear sequence of numbers expressed by products of the values of the powers of 2 and the above-mentioned coefficients. If the first quantization information is expressed as k and the second quantization information is expressed as (i/2+j), the quantization characteristics (QUANT) may be found by the equation (1)

$$QUANT=(i/2+j)\times 2^k+a\,(a=2^{(k+2)}-4) \quad (1)$$

where k and i are positive integers and i is 0 or 1. Using the quantization characteristic (QUANT), encoding or decoding of picture signals is performed by an encoder or a decoder, respectively.

It is noted that variable length coded data is contained in the bit stream encoded by the MPEG system. Therefore, a special code is required which enables monistical decoding even if a variety of possible variable length coded data should have occurred during decoding from an arbitrary point. In the above bit stream, the special code is a code consisting of 23 or more consecutive O's. In this consideration, the quantization characteristics (QUANT) in which the totality of bits in the quantization information is 0 is inhibited to limit the variable length code data other than the above special code data lest 23 or more Os should occur for any combinations of the other variable length code data.

The sequence represented by the equation (1) is an arithmetic progression having a constant difference between two adjacent terms equal to a power of 2, if the quantization information is thought to be constant. If the number expressed by the quantization information j is p, the constant difference is changed over at an interval of 2×p.

The quantization characteristics (QUANT) which may be expressed by the equation (1) are given in Table 8.

TABLE 8

| INDEX NUMBER | QUANTIZATION INFORMATION k | j | i | QUANTIZATION CHARACTERISTICS (QUANT) DECIMAL EXPRESSION | BINARY EXPRESSION | |
|---|---|---|---|---|---|---|
| 0 | 00 | 00 | 0 | inhibit | inhibit | ↑ |
| 1 | 00 | 00 | 1 | 0.5 | 00000.1 | |
| 2 | 00 | 01 | 0 | 1.0 | 00001.0 | |
| 3 | 00 | 01 | 1 | 1.5 | 00001.1 | |
| 4 | 00 | 10 | 0 | 2.0 | 00010.0 | 0 + X |
| 5 | 00 | 10 | 1 | 2.5 | 00010.1 | |
| 6 | 00 | 11 | 0 | 3.0 | 00011.0 | |
| 7 | 00 | 11 | 1 | 3.5 | 00011.1 | ↓ |
| 8 | 01 | 00 | 0 | 4.0 | 000100. | ↑ |
| 9 | 01 | 00 | 1 | 5.0 | 000101. | |
| 10 | 01 | 01 | 0 | 6.0 | 000110. | |
| 11 | 01 | 01 | 1 | 7.0 | 000111. | |
| 12 | 01 | 10 | 0 | 8.0 | 001000. | 4 + 2X |
| 13 | 01 | 10 | 1 | 9.0 | 001001. | |
| 14 | 01 | 11 | 0 | 10.0 | 001010. | |
| 15 | 01 | 11 | 1 | 11.0 | 001011. | ↓ |
| 16 | 10 | 00 | 0 | 12.0 | 001100. | ↑ |
| 17 | 10 | 00 | 1 | 14.0 | 001110. | |
| 18 | 10 | 01 | 0 | 16.0 | 010000. | |
| 19 | 10 | 01 | 1 | 18.0 | 010010. | |
| 20 | 10 | 10 | 0 | 20.0 | 010100. | 12 + 4X |
| 21 | 10 | 10 | 1 | 22.0 | 010110. | |
| 22 | 10 | 11 | 0 | 24.0 | 011000. | |
| 23 | 10 | 11 | 1 | 26.0 | 011010. | ↓ |
| 24 | 11 | 00 | 0 | 28.0 | 011100. | ↑ |
| 25 | 11 | 00 | 1 | 32.0 | 100000. | |
| 26 | 11 | 01 | 0 | 36.0 | 100100. | |
| 27 | 11 | 01 | 1 | 40.0 | 101000. | |
| 28 | 11 | 10 | 0 | 44.0 | 101100. | 28 + 8X |
| 29 | 11 | 10 | 1 | 48.0 | 110000. | |
| 30 | 11 | 11 | 0 | 52.0 | 110100. | |
| 31 | 11 | 11 | 1 | 56.0 | 111000. | ↓ |

In table 8, k, j and i of the quantization information are 2 bits, 2 bits and 1 bit, respectively, totalled at 5 bits, and the quantization characteristics (QUANT) associated therewith, inclusive of the binary representation, are also shown. The five bits of the quantization information are expressed as (Q1 Q2 Q3 Q4 Q5), beginning from the MSB. The first two bits of the quantization information k(Q1 Q2) represent the first quantization information for expressing the indices for the powers of 2. Of the remaining three bits of the quantization information, two bits j (Q3 Q4) and one bit i (Q5) represent the second quantization information which is a value corresponding to the coefficient to be multiplied by the powers of 2 of the equation (1).

A group of eight values of the quantization characteristics represented by X (=½+j) constitutes an arithmetic progression which has its constant difference changed at a changeover point from one group to the next group. If the nonlinear sequence of numbers shown in Table 8 is employed, the conversion of the quantization information may be grasped monistically. Consequently, if the width of quantization, its stepsize, is expressed by the value which may be represented by the equation (1), the necessity of providing a memory for storage of the corresponding conversion table may be eliminated.

Since the five bits represented by the quantization information k, j and i represent the number of bits required for transmitting the values of the quantization characteristics of from 1 to 31, the method and apparatus for encoding/decoding of picture signals employing the method for finding the quantization characteristics (QUANT) according to the present invention may be rendered interchangeable with the method and apparatus for encoding/decoding of picture signals employing the conventional method for finding the quantization characteristics.

In the above Table 8, the groups of the quantization characteristics (QUANT) are indicated as X. With an initial value a of each group X, the quantization characteristics (QUANT) may be expressed in terms of a and X by an equation $a+X\times2^n$, where n is a natural number. Thus the groups each composed of eight values may be expressed by 0+X, 4+2X, 12+4X and 28+8X, beginning from the leading end group.

The circuit provided within the picture signal decoding apparatus for reproducing quantization characteristics by the conversion into the non-linear sequence of numbers shown in Table 8 is shown schematically in FIG. 1.

The sequence of numbers of each group X may be expressed by $X\times2^n$, n being a natural number, if the quantization information (Q3 Q4 Q5) is entered into a shifter 110 and shifted using the values of the quantization information (Q1 Q2). That is, if the quantization information (Q1 Q2) is (0 0), (0 1), (1 0) or (1 1), the quantization information (Q3 Q4 Q5) is shifted by 0, 1, 2, or 3 bits, respectively.

Table 9 shows the values of the quantization information (Q1 Q2), entered to a table 111, a value of an output S1, issued after conversion by the table 111 and a value S2 sequentially read out in the table 111, as mentioned above.

TABLE 9

| Q1 | Q2 | S1 | S2 |
|---|---|---|---|
| 0 | 0 | 000 | 0 |
| 0 | 1 | 001 | 4 |
| 1 | 0 | 011 | 12 |
| 1 | 1 | 111 | 28 |

Figure 2:
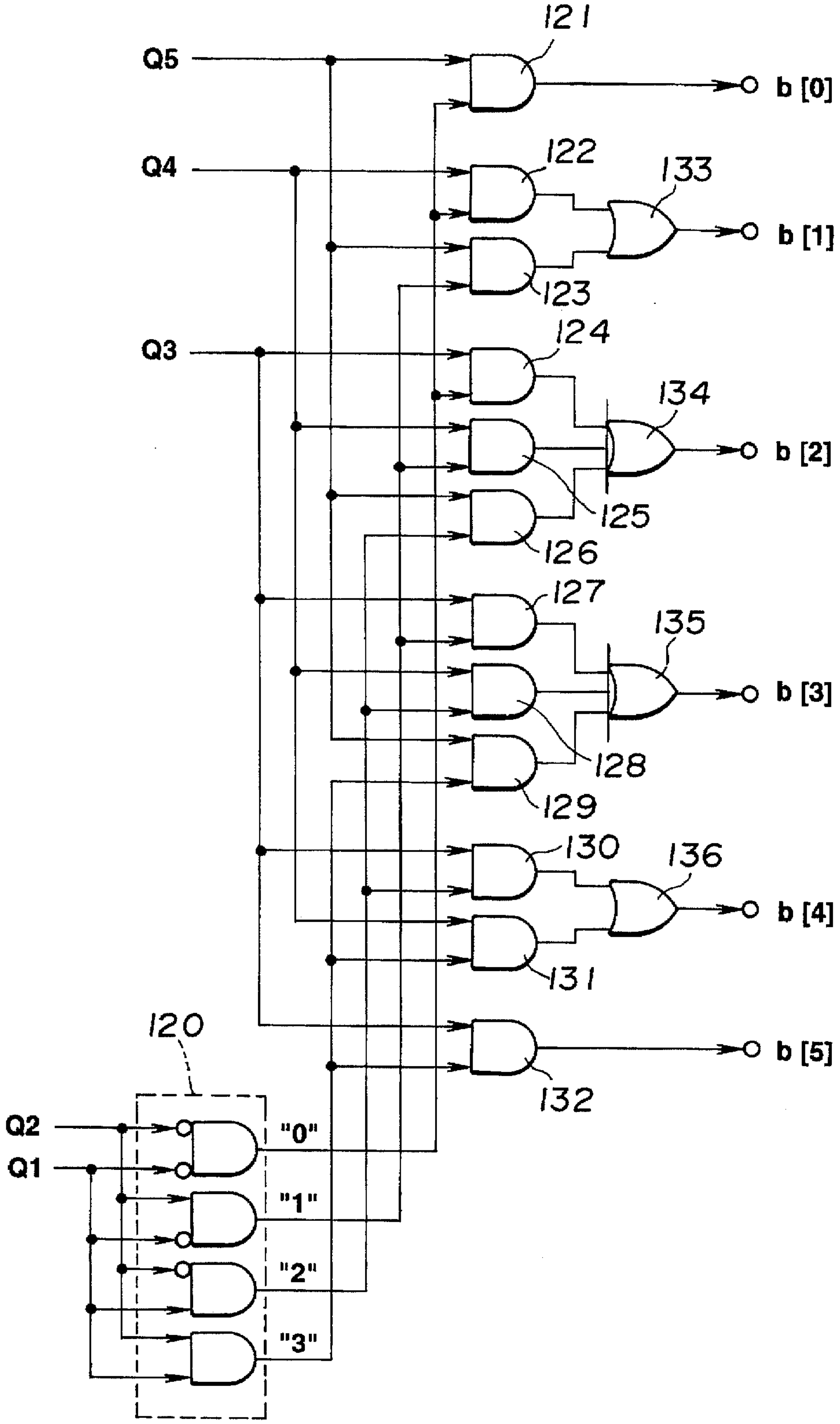
FIG. 2 shows a schematic arrangement of a shifter 110 in FIG. 1.

The construction of the shifter 110 shown in FIG. 1 is shown schematically in FIG. 2. The quantization information (Q3 Q4 Q5), entered at AND gates 121 to 132, is changed over depending on the shift amount generated on the basis of quantization information (Q1 Q2) by a shift amount generator 120 and is transmitted through OR gates 133, 136 and ExOR gates 134, 135. The resulting quantization information is outputted at bit 0 output terminal b[O] to bit 5 output terminal [5].

The values of 0, 4, 12 and 28, which are sequentially read out in accordance with the quantization information (Q1 Q2), are stored in the table 111. The upper three bits of the read out values and upper three bits of $X\times2^n$, n being a natural number, are summed in an additive node 112. The four bits of the resulting sum signal and the lower three bits of the value $X\times2^n$ appended thereto give the 7-bit quantization characteristics (QUANT) as reproduced values.

Figure 7:
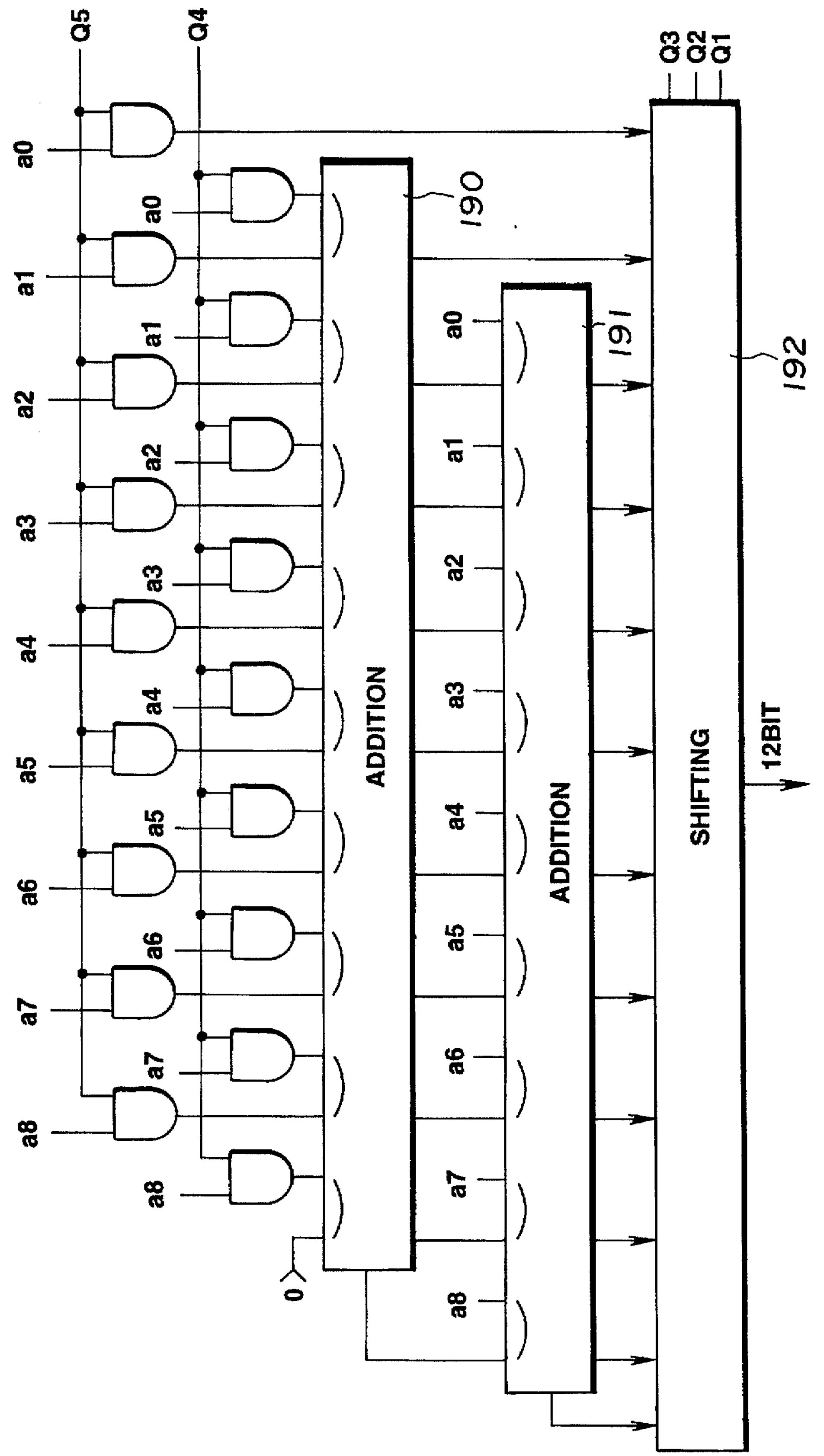
FIG. 7 shows a schematic arrangement of an inverse quantization circuit in the encoding apparatus and decoding apparatus for picture signals according to a fourth embodiment of the present invention.

The circuit arrangement for finding the above-described nonlinear quantization characteristics is smaller in size than the circuit arrangement for finding the conventional nonlinear quantization characteristics shown in FIG. 7. The reason is that the conventional non-linear quantization characteristics are destitute of periodicity and reference must be had incidentally to the table so that a large number of gates is required.

The quantization characteristics thus produced are multiplied by the conversion coefficient for the quantized picture data (the quantization data) by way of inverse quantization. Since the four of the seven bits are effective bits, as may be seen from Table 8, three-stage multiplier may be used for multiplying the quantization characteristics by the conversion coefficient as the quantized data (the quantization data) of the picture signals.

Figure 3:
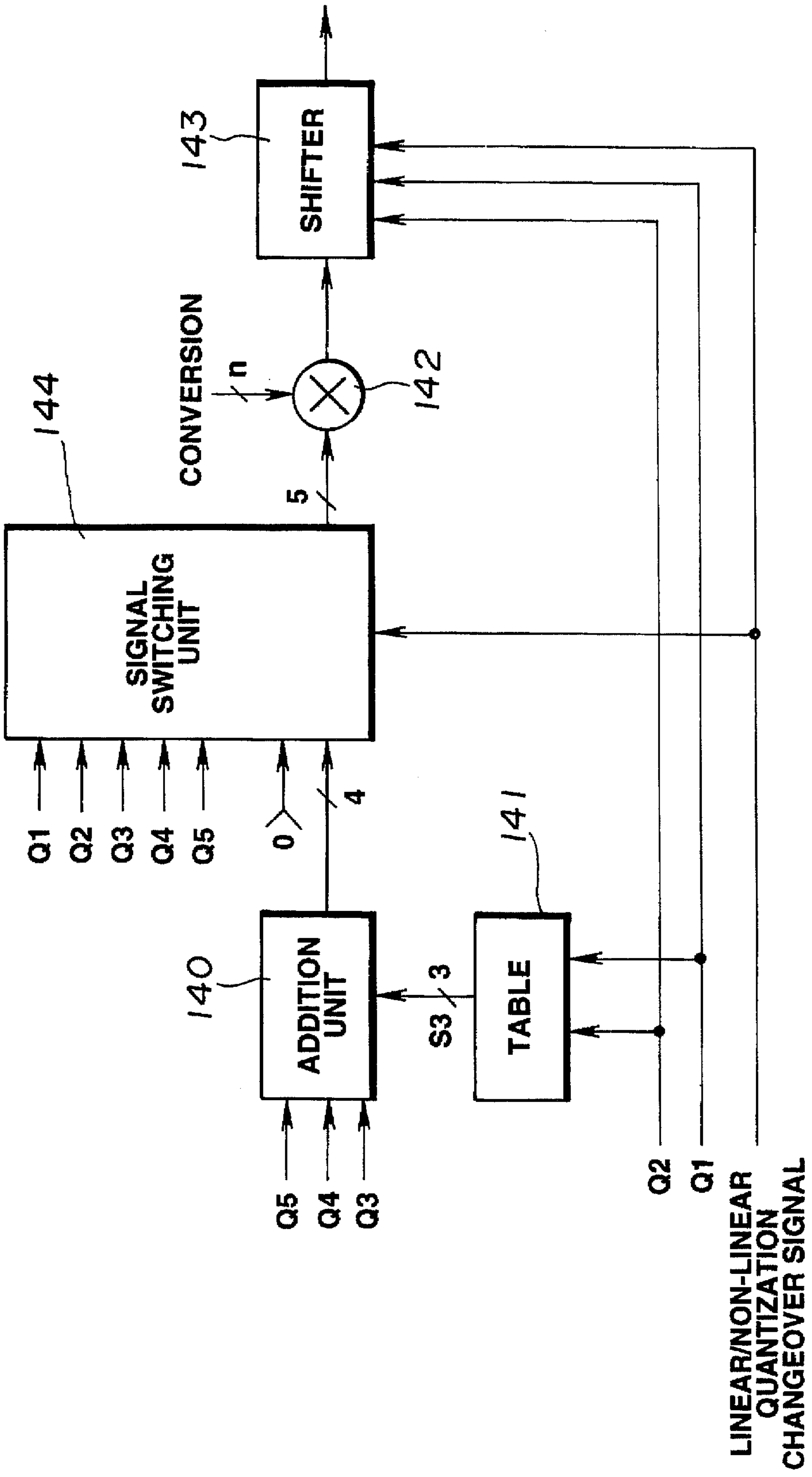
FIG. 3 shows a schematic arrangement of an inverse quantization circuit in the encoding apparatus and decoding apparatus for picture signals according to the present invention.

The arrangement of the inverse quantization circuit within the picture signal encoding and decoding apparatus is shown schematically in FIG. 3. The quantization information (Q1 Q2) entered to a table 141 is supplied to an addition unit 140 after conversion into a value S3 indicated in Table 10.

TABLE 10

| Q1 | Q2 | S3 |
|---|---|---|
| 0 | 0 | 000 |
| 0 | 1 | 100 |
| 1 | 0 | 110 |
| 1 | 1 | 111 |

In the addition unit 140, the value S3 and the quantization information (Q3 Q4 Q5) are summed together and the resulting sum is transmitted to a signal switching unit 144. To the signal switching unit 144 are also entered the quantization information (Q3 Q4 Q5) for carrying out the linear quantization and a MSB equal to 0 of the quantization information for carrying out the non-linear quantization. To the signal switching unit are additionally entered a linear/nonlinear quantization changeover signal for selecting which of the linear or non-linear quantization is to be carried out.

The linear quantization herein means that the values of the quantization information expressed as the binary values are related linearly with the values of the widths of quantization, that is the quantization step sizes. Conversely, the non-linear quantization means that the values of the quantization information expressed as the binary values are related nonlinearly with the values of the widths of quantization.

If linear quantization is selected in the signal switching unit 144 by the linear quantization/non-linear quantization changeover signal, the quantization information (Q1 Q2 Q3 Q4 Q5) for linear quantization is selected and transmitted to a multiplier 142. Conversely, if non-linear quantization is selected by the linear/nonlinear quantization changeover signal, the 4-bit quantization signal from the addition unit 140 and 0 as the MSB of the quantization information are selected and transmitted to the multiplier 142. The multiplier 142 multiplies the input quantization information with the n-bit conversion coefficient to give a product which is outputted to a shifter 143.

The quantization information (Q1 Q2) and the above-mentioned linear quantization/non-linear quantization changeover signal are entered to the shifter 143. If the linear quantization has been selected by the linear quantization/non-linear quantization changeover signal, the shifter 143 directly transmits the output of the multiplier 142 as the playback output. Conversely, if the non-linear quantization has been selected by the linear quantization/non-linear quantization changeover signal, the shifter 143 shifts the output of the multiplier 142 the number of bits dependent upon the input quantization information (Q1 Q2), as shown in Table 11, to output the shifted data as the playback data.

TABLE 11

| Linear/nonlinear quantization changeover signal | Q1 | Q2 | shift amount |
|---|---|---|---|
| linear quantization | x | x | 0 bit |
| non-linear quantization | 0 | 0 | 0 bit |
| non-linear quantization | 0 | 1 | 1 bit |
| non-linear quantization | 1 | 0 | 2 bits |
| non-linear quantization | 1 | 1 | 3 bits |

In the above Table, marks x for (Q1 Q2) for the linear quantization, as selected by the linear quantization/non-linear quantization changeover signal, indicate that the amount of shift is not affected by any possible combinations of the values of the quantization information (Q1 Q2).

If the reproduced value of the data on inverse quantization of the quantized data is A, the conversion coefficient as the quantization data is Coeff and the width of quantization is SP, the playback value A may be represented by $$A=\mathrm{Coeff}\times SP=\mathrm{Coeff}\times(2\times\mathrm{QUANT}) \quad (2)$$

If the non-linear quantization has been selected, the equation (2) employed for finding the quantization characteristics (QUANT) is modified to $$\mathrm{QUANT}=((i/2+j)+(4-4/2^k))\times 2^k \quad (3)$$

In the above equation, the term (i/2+j) corresponds to the second quantization information (Q3 Q4 Q5) entered to the addition unit 140, the term $(4-4/2^k)$) corresponds to the output of the table 141 and the term $2^k$ corresponds to the amount of shift in the shifter 143. Thus the playback value A is given by $$A=\mathrm{Coeff}((i/2+j)+(4-4/2^k))\times 2^{(k-1)} \quad (4)$$

The shifter 143 employed for finding the playback value A is simpler in construction than any prior art apparatus. The multiplier 142 of a smaller number of stages may also be employed, which is capable of multiplying n bits of the conversion coefficient, 4 bits of the output data of the switching unit 144 and the MSB.

In the above-described first embodiment, the maximum value that can be assumed by the quantization characteristics is 56.0, with the quantization width being 112. However, if the white noise, for example, is entered in actual pictures, larger values of quantization characteristics are required. For coping with this, the following two methods may be employed.

The first method is to allocate larger values of the quantization characteristics, such as 64, 96 or 128, for the quantization information of "00000" binary, which is currently not employed. If 64 or 128 is allocated as the values of the quantization characteristics, processing may be facilitated because shifting by a shifter suffices for multiplication in inverse quantization. If 96 is allocated as the value of the quantization characteristics, processing may similarly be facilitated because a single-stage addition unit suffices.

The second method is to allocate the values of the quantization characteristics of 64, 96 or, 128 for the quantization information of "11111" binary, in consideration that a long sequence of "O" is likely to be produced if the quantization information "00000" binary is employed.

The quantization characteristics for the case in which the amount of shift of the fourth group represented by 28×8X is changed significantly is shown in Table 12 by way of a third embodiment.

TABLE 12

| INDEX NUMBER | QUANTIZATION INFORMATION k | j | i | QUANTIZATION CHARACTERISTICS (QUANT) DECIMAL EXPRESSION | BINARY EXPRESSION | |
|---|---|---|---|---|---|---|
| 0 | 00 | 00 | 0 | inhibit | inhibit | ↑ |
| 1 | 00 | 00 | 1 | 0.5 | 00000.1 | |
| 2 | 00 | 01 | 0 | 1.0 | 00001.0 | |
| 3 | 00 | 01 | 1 | 1.5 | 00001.1 | |
| 4 | 00 | 10 | 0 | 2.0 | 00010.0 | 0 + X |
| 5 | 00 | 10 | 1 | 2.5 | 00010.1 | |
| 6 | 00 | 11 | 0 | 3.0 | 00011.0 | |
| 7 | 00 | 11 | 1 | 3.5 | 00011.1 | ↓ |
| 8 | 01 | 00 | 0 | 4.0 | 000100. | ↑ |
| 9 | 01 | 00 | 1 | 5.0 | 000101. | |
| 10 | 01 | 01 | 0 | 6.0 | 000110. | |
| 11 | 01 | 01 | 1 | 7.0 | 000111. | |
| 12 | 01 | 10 | 0 | 8.0 | 001000. | 4 + 2X |
| 13 | 01 | 10 | 1 | 9.0 | 001001. | |
| 14 | 01 | 11 | 0 | 10.0 | 001010. | |
| 15 | 01 | 11 | 1 | 11.0 | 001011. | ↓ |
| 16 | 10 | 00 | 0 | 12.0 | 001100. | ↑ |
| 17 | 10 | 00 | 1 | 14.0 | 001110. | |
| 18 | 10 | 01 | 0 | 16.0 | 010000. | |
| 19 | 10 | 01 | 1 | 18.0 | 010010. | |
| 20 | 10 | 10 | 0 | 20.0 | 010100. | 12 + 4X |
| 21 | 10 | 10 | 1 | 22.0 | 010110. | |
| 22 | 10 | 11 | 0 | 24.0 | 011000. | |
| 23 | 10 | 11 | 1 | 26.0 | 011010. | ↓ |
| 24 | 11 | 00 | 0 | 28.0 | 011100. | ↑ |
| 25 | 11 | 00 | 1 | 36.0 | 100100. | |
| 26 | 11 | 01 | 0 | 44.0 | 101100. | |
| 27 | 11 | 01 | 1 | 52.0 | 110100. | |
| 28 | 11 | 10 | 0 | 60.0 | 111100. | 28 + 16X |
| 29 | 11 | 10 | 1 | 68.0 | 1000100. | |
| 30 | 11 | 11 | 0 | 76.0 | 1001100. | |
| 31 | 11 | 11 | 1 | 84.0 | 1010100. | ↓ |

The quantization information of the fourth group, represented by 28+16X in Table 12, is found by intentionally setting the maximum value of the shift amount indicated by the quantization information k so as to be larger to disregard the continuity of the quantization information k. Thus the maximum possible value of the quantization characteristics is 84.0 which is large enough to accommodate special noise such as the white noise. This method is desirable in controlling the coding because it renders it possible to provide continuous quantization characteristics up to the maximum value. In the present third embodiment, the quantization information "00000" is inhibited, as in the above-described first embodiment.

Figure 4:
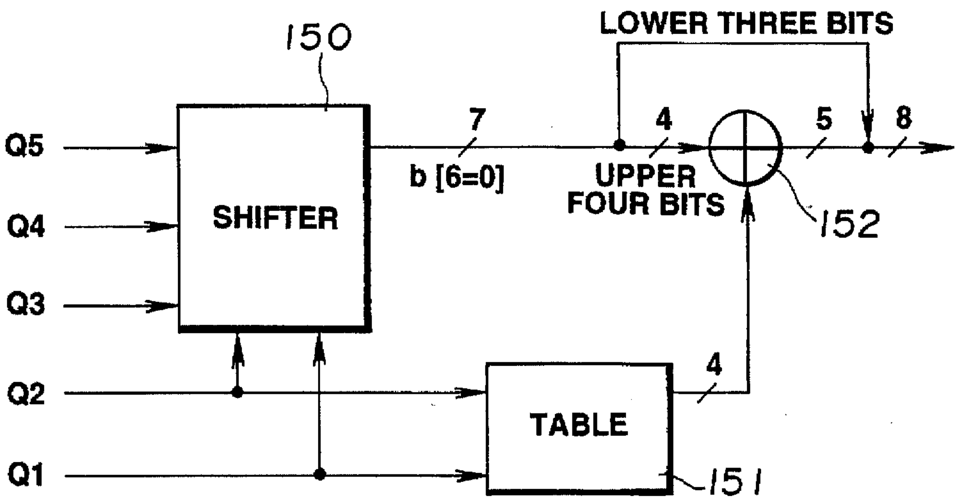
FIG. 4 illustrates a schematic arrangement of a circuit for reproducing quantization characteristics within an encoding apparatus and a decoding apparatus for picture signals according to a third embodiment of the present invention.

The circuit for reproducing the quantization characteristics, provided within the picture signal decoding apparatus for reproducing the quantization characteristics by conversion into a non-linear sequence of numbers shown in Table 12, is shown schematically in FIG. 4.

The values of $X\times 2^n$, n being a natural number, may be expressed by entering the quantization information (Q3 Q4 Q5) to a shifter 150 and by shifting the quantization information (Q3 Q4 Q5) using the values of the quantization information (Q1 Q2). That is, the quantization information (Q3 Q4 Q5) is shifted by 0, 1, 2 or 4 bits if the quantization information (Q1 Q2) is (0 0), (0 1), (1 0) or (1 1), respectively.

Figure 5:
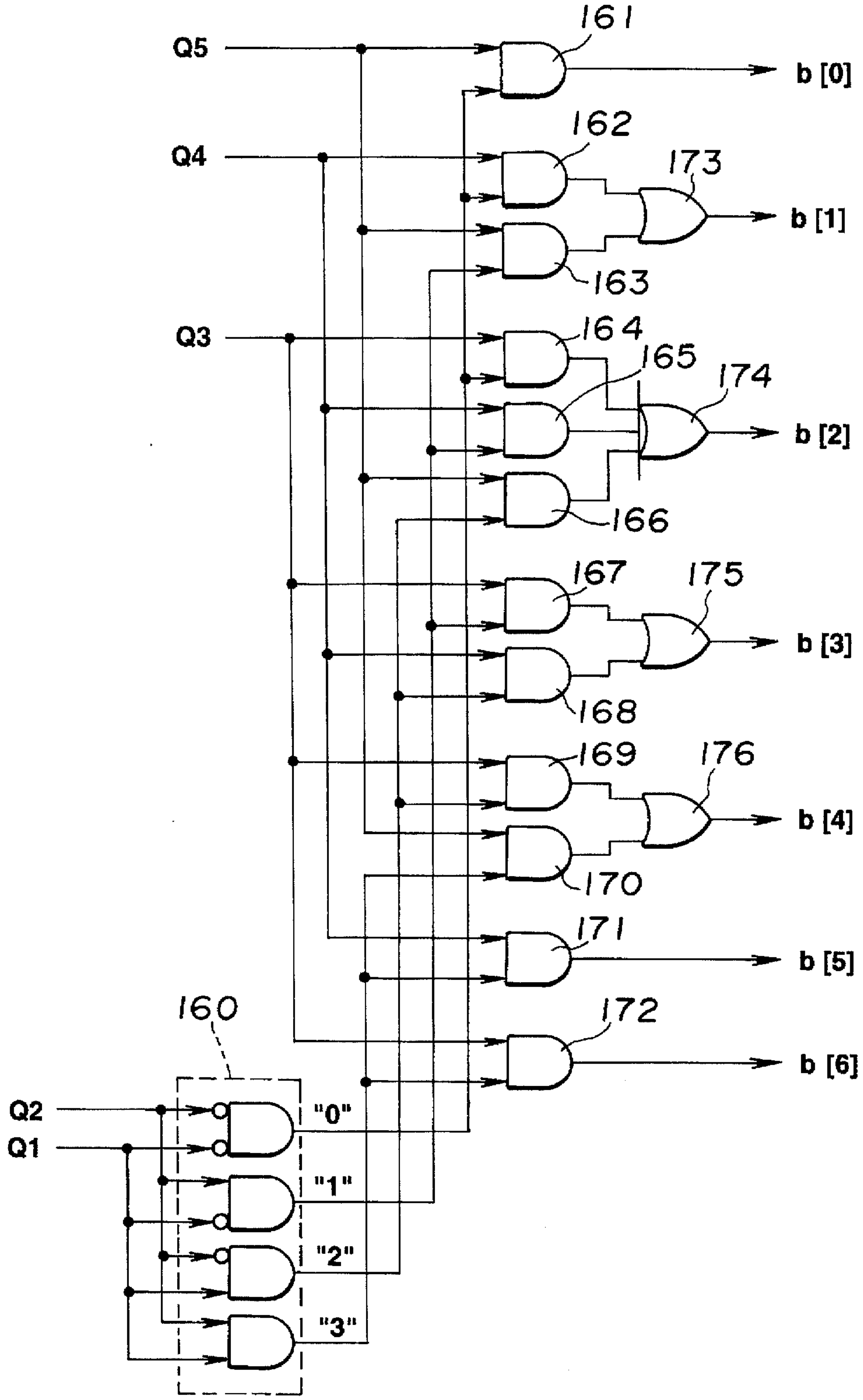
FIG. 5 shows a schematic arrangement of a shifter 110 in FIG. 1.

FIG. 5 shows a schematic construction of the shifter 150 shown in FIG. 4. The quantization information (Q3 Q4 Q5) entered to AND gates 161 to 172 is changed over responsive to the shift amount produced in a shift amount generator 160 based on the quantization information (Q1 Q2), and is transmitted via OR gates 173, 175 and an ExOr gate 174 so that the quantization information is outputted at a bit 0 output terminal b[0] to bit 6 output terminal b[6].

The values of 0, 4, 12 and 28, which are read out sequentially in accordance with the quantization information (Q1, Q2), are stored in a table 151, and upper four bits of the read-out values and upper four bits of the value $X\times2^n$, n being a natural number, are summed together in an additive node 152. The five-bit sum value is appended to lower three bits of the value. $X\times2^n$ to reproduce the 8-bit quantization characteristics (QUANT). The values sequentially read out from the table 151 are those shown in Table 9, as in the above-described first embodiment.

Figure 6:
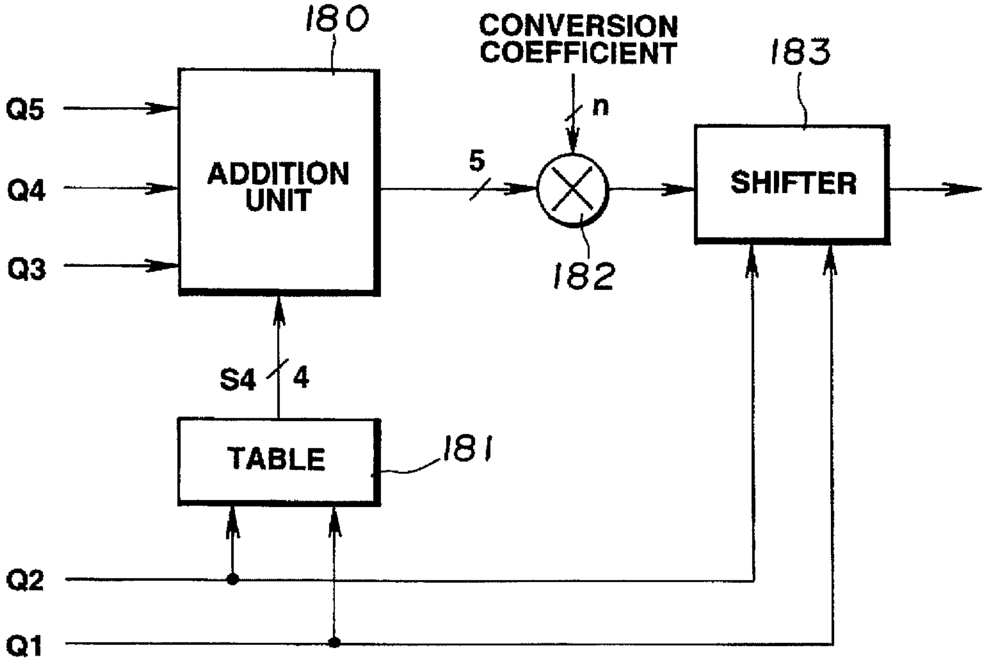
FIG. 6 shows a schematic arrangement of an inverse quantization circuit in the encoding apparatus and decoding apparatus for picture signals according to the third embodiment of the present invention.

The inverse quantization circuit in the encoding/decoding apparatus for picture signals is shown schematically in FIG. 6. The quantization information (Q1 Q2) entered to a table 181 is converted into the values S4 shown in Table 13 so as to be supplied to an addition unit 180.

TABLE 13

| Q1 | Q2 | S4 |
|---|---|---|
| 0 | 0 | 0 0 0 0 |
| 0 | 1 | 1 0 0 0 |
| 1 | 0 | 1 1 0 0 |
| 1 | 1 | 0 1 1 1 |

In the addition unit 180, the value S4 from the table 181 and the quantization information (Q3 Q4 Q5) are summed together and the resulting sum is multiplied in a multiplier 182 with an n-bit conversion coefficient. The resulting product is shifted in a shifter 183, based on the quantization information (Q1 Q2) for reproducing picture data. Meanwhile, the number of bits from the multiplier 182 of the inverse quantization circuit in the present third embodiment differs from the number of bits from the multiplier 142 of the inverse quantization circuit in the above described first embodiment.

That is, if the quantization information k in the third embodiment has the values of 0, 1 or 2, the playback value A of the picture data may be found from the equation (4). On the other hand, if the quantization information k has a value of 3, the playback value A of the picture data may be found from $$A=\mathrm{Coeff}\times((i/2+j)+1.75)\times2^5 \quad (5)$$

The shifter 183 employed for finding the playback value A is simpler in construction than any prior art apparatus. The multiplier 182 of a smaller number of stages may also be employed, which is capable of multiplying n bits of the conversion coefficient and 5 bits of the output data of the multiplier 180.

A fourth embodiment of the present invention is hereinafter explained. With the encoding method for picture signals according to the present invention, the picture signals are quantized in accordance with the quantization characteristics (QUANT) represented by $$\mathrm{QUANT}=2^{(m-1)}+a_1\times2^{(m-2)}+a_2\times2^{(m-3)}+\ldots+a_n\times2^{(m-n-1)} \quad (6)$$

where m is an integer index of a power necessary for representing the quantization characteristics, and $a_i$, i being an integer from 1 to n, n is a pre-set integer for representing the fineness of the quantization characteristics.

In the present fourth embodiment, the signals are quantized with values of the index m being integers of from 0 to 7 and the fineness n of the quantization characteristics of 2, as a typical example for the equation (6). Although the value (m−1) is employed in the equation (6) in place of m as the index of the power, there is no essential difference whether the index m or (m−1) is employed.

The quantization characteristics which may be represented by the above equation (6) are shown in Table 14.

TABLE 14

| INDEX | QUANTIZATION INFORMATION (QUANT) | |
|---|---|---|
| NUMBER | DECIMAL EXPRESSION | BINARY EXPRESSION |
| 0 | 0.5 | 0000000.1 |
| 1 | 0.625 | 0000000.101 |
| 2 | 0.75 | 0000000.11 |
| 3 | 0.875 | 0000000.111 |
| 4 | 1.0 | 0000001 |
| 5 | 1.25 | 0000001.01 |
| 6 | 1.5 | 0000001.1 |
| 7 | 1.75 | 0000001.11 |
| 8 | 2.0 | 0000010 |
| 9 | 2.5 | 0000010.1 |
| 10 | 3.0 | 0000011 |
| 11 | 3.5 | 0000011.1 |
| 12 | 4.0 | 0000100 |
| 13 | 5.0 | 0000101 |
| 14 | 6.0 | 0000110 |
| 15 | 7.0 | 0000111 |
| 16 | 8.0 | 0001000 |
| 17 | 10.0 | OoQlolo |
| 18 | 12.0 | 000ii-00 |
| 19 | 14.0 | 0001110 |
| 20 | 16.0 | 0010000 |
| 21 | 20.0 | 0010100 |
| 22 | 24.0 | 0011000 |
| 23 | 28.0 | 0011100 |
| 24 | 32.0 | 0100000 |
| 25 | 40.0 | 0101000 |
| 26 | 48.0 | 0110000 |
| 27 | S6.0 | 0111000 |
| 28 | 64.0 | 1000000 |
| 29 | 80.0 | 1010000 |
| 30 | 96.0 | 1100000 |
| 31 | 112.0 | 1110000 |

If the non-linear sequence shown in Table 14 is employed, the mapping may be determined monistically by the equation (6), so that there is no necessity of providing a memory for storing the mapping data.

If the mapping to the non-linear sequence shown in Table 14 is employed, the following code data is transmitted for transmitting the quantization information according to the equation (6). First, for transmitting the quantization information m, it is necessary to transmit integers of from 0 to 7, so three bits are required. The quantization information $a_1$, and $a_2$, each require one bit so a total of five bits are required. Five bits is also precisely the number required for transmitting the values of 1 to 31, so that compatibility of the system operating under the conventional quantization characteristics with the system operating under the quantization characteristics according to the present invention may be maintained.

A typical construction of the 5-bit quantization information (Q1 Q2 Q3 Q4 Q5) is given herein below. The quantization information m is represented by the first three bits (Q1 Q2 Q3) binary, and the quantization information $a_1$ and the quantization information $a_2$ are represented each by one bit (Q4 Q5).

| | |
|---|---|
| Q1 Q2 Q3 Q4 Q5 | :5 bits |
| Q1 Q2 Q3 | :000 to 111: quantization information m |
| Q4 | :0 or 1: quantization information $a_1$ |
| Q5 | :0 or 1: quantization information $a_2$ |

The inverse quantization when employing the mapping to the non-linear sequence shown in Table 14 is now considered. If the non-linear sequence shown in Table 14 is represented by binary numbers, only three bits become "1" simultaneously in any of the binary numbers. Consequently, addition is performed twice at the maximum and two adders suffice. Besides, the bits "1" occur consecutively without occurring at random, so that it suffices to shift data to a desired place by a shifter placed downstream of two-stage adders. The inverse quantization circuit according to the present invention, which is based on the above-described principle, is shown in FIG. 7. The inverse quantization device according to the present invention is made up of two full adders 190, 191 and a shifter 192. The shifter shifts data left by a number of bits shown in Table 15 depending on the value of (Q1 Q2 Q3). At this time, the LSB is padded with 0.

By way of a concrete example, the case in which a DCT coefficient, which is equal to 100, is guantized with a quantization width of 20, is explained. The quantization characteristic is equal to 5, which value is transmitted after coding to "000000101" if nine bits are employed for coding. If encoded with five bits by the method of the present invention, the width of quantization of 20, encoded in five bits, becomes "10101" because 20=16+4, $16=2^4$ and $4=2^2$, so that m=5, $a_1=0$ and $a_2=1$.

On reception of the quantization value (quantization data) of "000000101" and the width of quantization of "10101", the decoder enters the data to the inverse quantization circuit. That is, in FIG. 7, aO . . . a8="000000101" and Q1 Q2 Q3="101": quantization information m

Q4="O"

Q5="1"

In the inverse quantization circuit, shown in FIG. 7, since Q5="1" aO to a8 in the upper most row are directly entered to an adder 190. However, since Q4="O" an output of aO to a8 of the next row become "O" without being entered to the adder 190.

AO to a8 in the third row are added to the result of addition, so that the new sum result is "000000011001". This value is entered to the shifter 192 and shifted by two bits in accordance with Q1 Q2 Q3="101" so that an output, of the shifter 192 becomes "000001100100" and hence the quantization value of "100" digital is produced. The amounts of shift in the shifter 192 and the method of computing the amounts of shift in the present concrete example are shown in Tables 15 and 16, respectively.

TABLE 15

| Q3 Q2 Q1 | amount of left shift (0 pad) |
|---|---|
| 0 | right shift: 3 or shift binary point left: 3 |
| 1 | right shift: 2 or shift binary point left: 2 |
| 2 | right shift: 1 or shift binary point left: 1 |
| 3 | 0 |
| 4 | 1 |
| 5 | 2 |

TABLE 15-continued

| Q3 Q2 Q1 | amount of left shift (0 pad) |
|---|---|
| 6 | 3 |
| 7 | 4 |

TABLE 16

| | |
|---|---|
| 000000101 | ← Q5 = 1 |
| 000000000 | ← Q4 = 0 |
| +) 00000101 | |
| 000000011001 | ← input to shifter |
| ↓ | |
| 000001100100 | ← output from shifter |

A fifth embodiment of the present invention is explained. In the fourth embodiment, the fineness of quantization characteristics up to the third place below the binary point in binary representation is defined, as shown in Table 14. However, the fineness of quantization characteristics accepted by the quantization circuit is determined independently. For example, if the fineness of quantization characteristics accepted by the quantization circuit is up to the first place below the binary point in binary representation, the quantization information shown in Table 14, having the excessive fineness of quantization characteristics are inhibited. The quantization characteristics limited is this manner are shown in Table 17. In the fifth embodiment, the inhibited quantization information cannot be employed.

TABLE 17

| QUANTIZATION INFORMATION | | | QUANTIZATION CHARACTERISTICS (QUANT) | |
|---|---|---|---|---|
| m | a1 | a2 | DECIMAL EXPRESSION | BINARY EXPRESSION |
| 000 | 0 | 0 | 0.5 | 0000000.1 |
| 000 | 0 | 1 | inhibit | inhibit |
| 000 | 1 | 0 | inhibit | inhibit |
| 000 | 1 | 1 | inhibit | inhibit |
| 001 | 0 | 0 | 1.0 | 0000001 |
| 001 | 0 | 1 | inhibit | inhibit |
| 001 | 1 | 0 | 1.5 | 0000001.1 |
| 001 | 1 | 1 | inhibit | inhibit |
| 010 | 0 | 0 | 2.0 | 0000010 |
| 010 | 0 | 1 | 2.5 | 0000010.1 |
| 010 | 1 | 0 | 3.0 | 0000011 |
| 010 | 1 | 1 | 3.5 | 0000011.1 |
| 011 | 0 | 0 | 4.0 | 0000100 |
| 011 | 0 | 1 | 5.0 | 0000101 |
| 011 | 1 | 0 | 6.0 | 0000110 |
| 011 | 1 | 1 | 7.0 | 0000111 |
| 100 | 0 | 0 | 8.0 | 0001000 |
| 100 | 0 | 1 | 10.0 | 0001010 |
| 100 | 1 | 0 | 12.0 | 0001100 |
| 100 | 1 | 1 | 14.0 | 0001110 |
| 101 | 0 | 0 | 16.0 | 0010000 |
| 101 | 0 | 1 | 20.0 | 0010100 |
| 101 | 1 | 0 | 24.0 | 0011000 |
| 101 | 1 | 1 | 28.0 | 0011100 |
| 110 | 0 | 0 | 32.0 | 0100000 |
| 110 | 0 | 1 | 40.0 | 0101000 |
| 110 | 1 | 0 | 48.0 | 0110000 |
| 110 | 1 | 1 | 56.0 | 0111000 |
| 111 | 0 | 0 | 64.0 | 1000000 |
| 111 | 0 | 1 | 80.0 | 1010000 |
| 111 | 1 | 0 | 96.0 | 1100000 |
| 111 | 1 | 1 | 112.0 | 1110000 |

In a sixth embodiment, the quantization information having the excessive fineness of quantization characteristics is changed as to the manner of allocation thereof so as to represent the near-by quantization characteristics having acceptable fineness, instead of inhibiting the quantization information having the excessive fineness of quantization characteristics. This embodiment is shown in Table 18, in which the quantization information representing quantization characteristics of, for example, 0.5, is "000xx". x indicating "don't care" thus showing that the bit in these positions may be 0 or 1. In the present sixth embodiment, there is no inhibited quantization information, as in the fifth embodiment.

TABLE 18

| QUANTIZATION INFORMATION | | | QUANTIZATION CHARACTERISTICS (QUANT) | |
|---|---|---|---|---|
| m | a1 | a2 | DECIMAL EXPRESSION | BINARY EXPRESSION |
| 000 | x | x | 0.5 | 0000000.1 |
| 000 | 0 | 0 | | |
| 000 | 0 | 1 | | |
| 000 | 1 | 0 | | |
| 000 | 1 | 1 | | |
| 001 | 0 | x | 1.0 | 0000001 |
| 001 | 0 | 0 | | |
| 001 | 0 | 1 | | |
| 001 | 1 | x | 1.5 | 0000001.1 |
| 001 | 1 | 0 | | |
| 001 | 1 | 1 | | |
| 010 | 0 | 0 | 2.0 | 0000010 |
| 010 | 0 | 1 | 2.5 | 0000010.1 |
| 010 | 1 | 0 | 3.0 | 0000011 |
| 010 | 1 | 1 | 3.5 | 0000011.1 |
| 011 | 0 | 0 | 4.0 | 0000100 |
| 011 | 0 | 1 | 5.0 | 0000101 |
| 011 | 1 | 0 | 6.0 | 0000110 |
| 011 | 1 | 1 | 7.0 | 0000111 |
| 100 | 0 | 0 | 8.0 | 0001000 |
| 100 | 0 | 1 | 10.0 | 0001010 |
| 100 | 1 | 0 | 12.0 | 0001100 |
| 100 | 1 | 1 | 14.0 | 0001110 |
| 101 | 0 | 0 | 16.0 | 0010000 |
| 101 | 0 | 1 | 20.0 | 0010100 |
| 101 | 1 | 0 | 24.0 | 0011000 |
| 101 | 1 | 1 | 28.0 | 0011100 |
| 110 | 0 | 0 | 32.0 | 0100000 |
| 110 | 0 | 1 | 40.0 | 0101000 |
| 110 | 1 | 0 | 48.0 | 0110000 |
| 110 | 1 | 1 | 56.0 | 0111000 |
| 111 | 0 | 0 | 64.0 | 1000000 |
| 111 | 0 | 1 | 80.0 | 1010000 |
| 111 | 1 | 0 | 96.0 | 1100000 |
| 111 | 1 | 1 | 112.0 | 1110000 |

It is noted that variable length coded data is contained in the bit stream encoded by the MPEG system. Therefore, a special code is required which enables monistical decoding if, when decoding is made from an arbitrary point, a variety of possible variable length coded data should have occurred. In the encoded bit stream according to the MPEG system, the special code is a code consisting of 23 or more consecutive O's. Thus, limitations are imposed on the variable length code data lest 23 or more Os should occur for any combinations of the other variable length code data.

Consequently, the quantization information constituted only by Os is not used as far as is possible. Thus, in Tables 14, 17 and 18, the quantization information "00000" presents problems. For overcoming the problems, the one's complement of the quantization information from Table 14 is used to inhibit the large quantization characteristic 112 which is thought to be used only on rare occasions. Such example is shown in Table 19. Table 20 shows an example in which the fineness of Table 18 is doubled for inverting the quantization information.

TABLE 19

| QUANTIZATION INFORMATION | | | QUANTIZATION CHARACTERISTICS (QUANT) | |
|---|---|---|---|---|
| m | a1 | a2 | DECIMAL EXPRESSION | BINARY EXPRESSION |
| 111 | 1 | 1 | 0.5 | 0000000.1 |
| 111 | 1 | 0 | 0.625 | 0000000.101 |
| 111 | 0 | 1 | 0.75 | 0000000.11 |
| 111 | 0 | 0 | 0.875 | 0000000.111 |
| 110 | 1 | 1 | 1.0 | 0000001 |
| 110 | 1 | 0 | 1.25 | 0000001.01 |
| 110 | 0 | 1 | 1.5 | 0000001.1 |
| 110 | 0 | 0 | 1.75 | 0000001.11 |
| 101 | 1 | 1 | 2.0 | 0000010 |
| 101 | 1 | 0 | 2.5 | 0000010.1 |
| 101 | 0 | 1 | 3.0 | 0000011 |
| 101 | 0 | 0 | 3.5 | 0000011.1 |
| 100 | 1 | 1 | 4.0 | 0000100 |
| 100 | 1 | 0 | 5.0 | 0000101 |
| 100 | 0 | 1 | 6.0 | 0000110 |
| 100 | 0 | 0 | 7.0 | 0000111 |
| 011 | 1 | 1 | 8.0 | 0001000 |
| 011 | 1 | 0 | 10.0 | 0001010 |
| 011 | 0 | 1 | 12.0 | 0001100 |
| 011 | 0 | 0 | 14.0 | 0001110 |
| 010 | 1 | 1 | 16.0 | 0010000 |
| 010 | 1 | 0 | 20.0 | 0010100 |
| 010 | 0 | 1 | 24.0 | 0011000 |
| 010 | 0 | 0 | 28.0 | 0011100 |
| 001 | 1 | 1 | 32.0 | 0100000 |
| 001 | 1 | 0 | 40.0 | 0101000 |
| 001 | 0 | 1 | 48.0 | 0110000 |
| 001 | 0 | 0 | 56.0 | 0111000 |
| 000 | 1 | 1 | 64.0 | 1000000 |
| 000 | 1 | 0 | 80.0 | 1010000 |
| 000 | 0 | 1 | 96.0 | 1100000 |
| 000 | 0 | 0 | inhibit | inhibit |

TABLE 20

| QUANTIZATION INFORMATION | | | QUANTIZATION CHARACTERISTICS (QUANT) | |
|---|---|---|---|---|
| m | a1 | a2 | DECIMAL EXPRESSION | BINARY EXPRESSION |
| 111 | x | x | 1.0 | 0000000.1 |
| 111 | 1 | 1 | | |
| 111 | 1 | 0 | | |
| 111 | 0 | 1 | | |
| 111 | 0 | 0 | | |
| 110 | 1 | x | 2.0 | 0000001 |
| 110 | 1 | 1 | | |
| 110 | 1 | 0 | | |
| 110 | 0 | x | 3.0 | 0000001.1 |
| 110 | 0 | 1 | | |
| 110 | 0 | 0 | | |
| 101 | 1 | 1 | 4.0 | 0000010 |
| 101 | 1 | 0 | 5.0 | 0000010.1 |
| 101 | 0 | 1 | 6.0 | 0000011 |
| 101 | 0 | 0 | 7.0 | 0000011.1 |
| 100 | 1 | 1 | 8.0 | 0000100 |
| 100 | 1 | 0 | 10.0 | 0000101 |
| 100 | 0 | 1 | 12.0 | 0000110 |
| 100 | 0 | 0 | 14.0 | 0000111 |
| 011 | 1 | 1 | 16.0 | 0001000 |
| 011 | 1 | 0 | 20.0 | 0001010 |
| 011 | 0 | 1 | 24.0 | 0001100 |
| 011 | 0 | 0 | 28.0 | 0001110 |
| 010 | 1 | 1 | 32.0 | 0010000 |
| 010 | 1 | 0 | 40.0 | 0010100 |
| 010 | 0 | 1 | 48.0 | 0011000 |
| 010 | 0 | 0 | 56.0 | 0011100 |
| 001 | 1 | 1 | 64.0 | 0100000 |
| 001 | 1 | 0 | 80.0 | 0101000 |

TABLE 20-continued

| QUANTI-ZATION INFORMATION | | | QUANTIZATION CHARACTERISTICS (QUANT) | |
|---|---|---|---|---|
| m | a1 | a2 | DECIMAL EXPRESSION | BINARY EXPRESSION |
| 001 | 0 | 1 | 96.0 | 0110000 |
| 001 | 0 | 0 | 112.0 | 0111000 |
| 000 | 1 | 1 | 128.0 | 1000000 |
| 000 | 1 | 0 | 160.0 | 1010000 |
| 000 | 0 | 1 | 192.0 | 1100000 |
| 000 | 0 | 0 | inhibit | inhibit |

An encoding/decoding apparatus for picture signals in which linear quantization is changed over to non-linear quantization and vice versa when employing the information is hereinafter explained.

Figure 16:
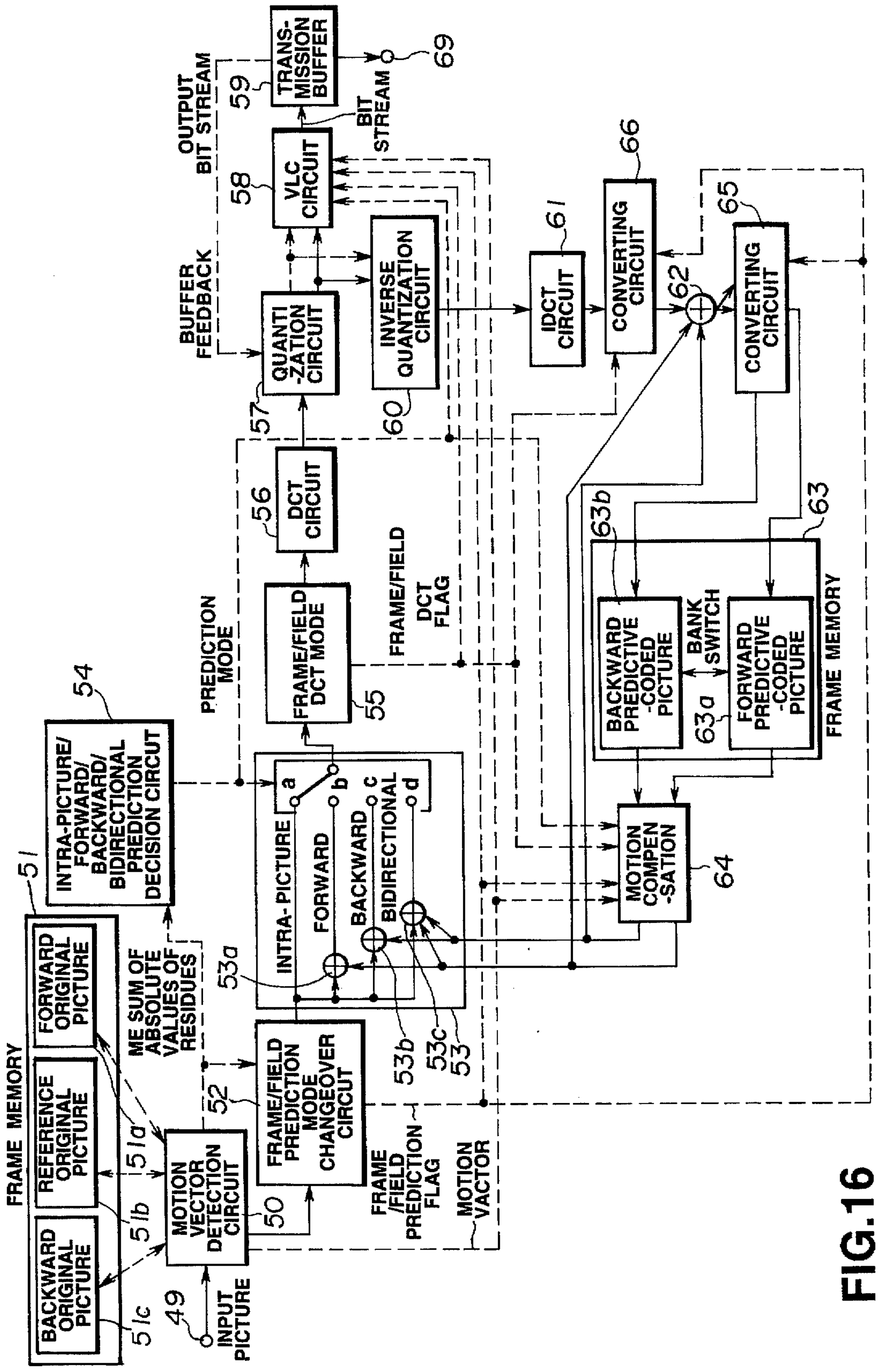
FIG. 16 is a block circuit diagram showing a typical structure of the encoder 18 shown in FIG. 14.
Figure 17:
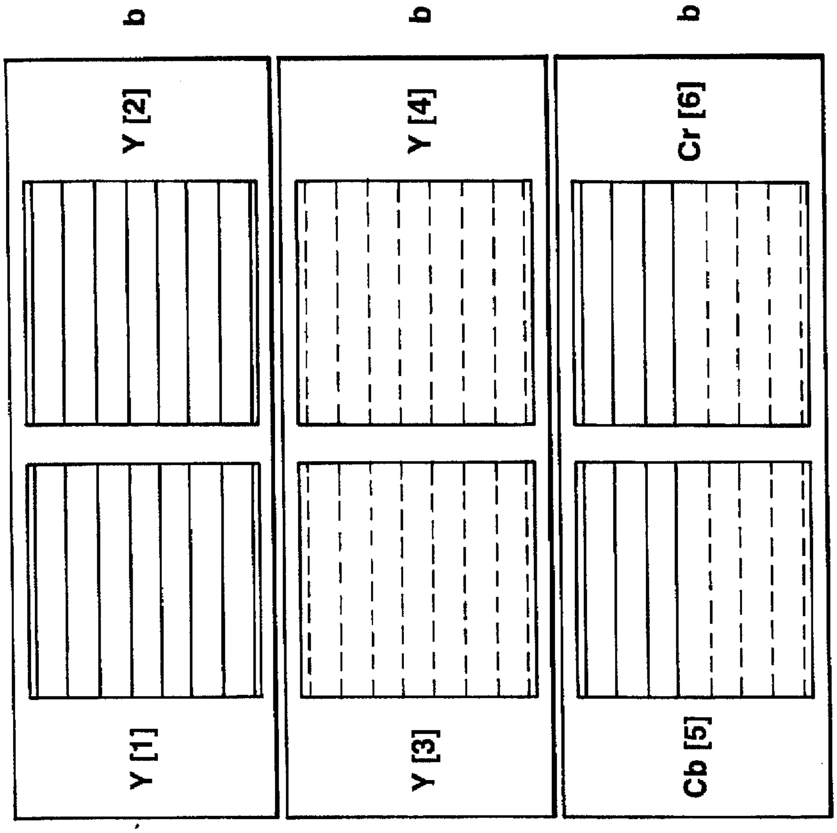
FIG. 17 illustrates the operation of the prediction mode changeover circuit 52 shown in FIG. 16.
Figure 17:
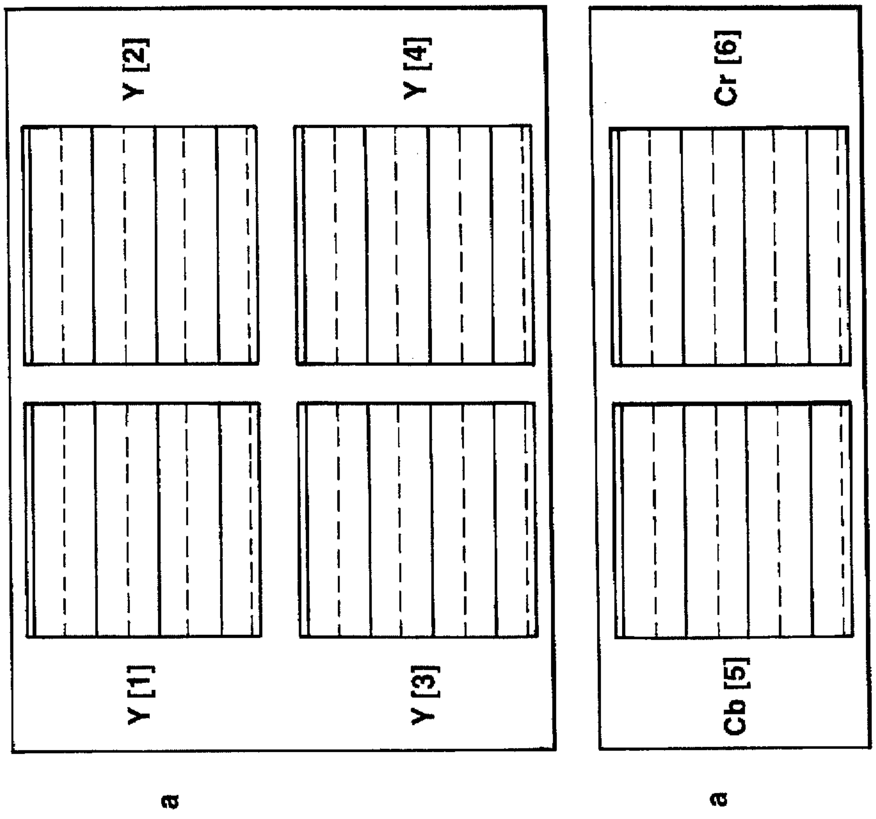
Figure 18B:
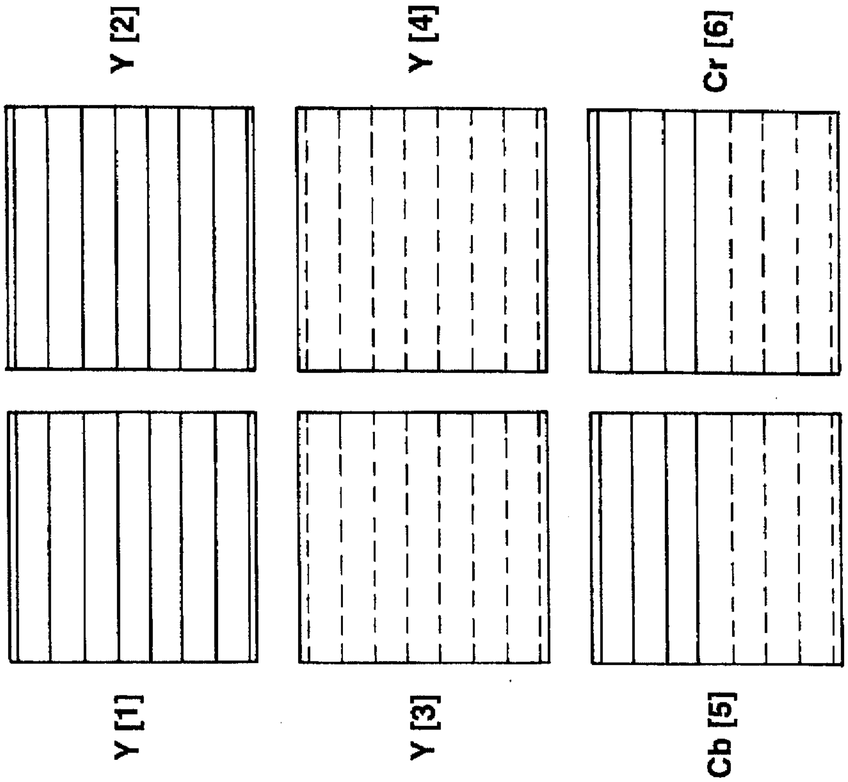
FIG. 18 illustrates the operation of the DCT mode changeover circuit 52 shown in FIG. 16.
Figure 18A:
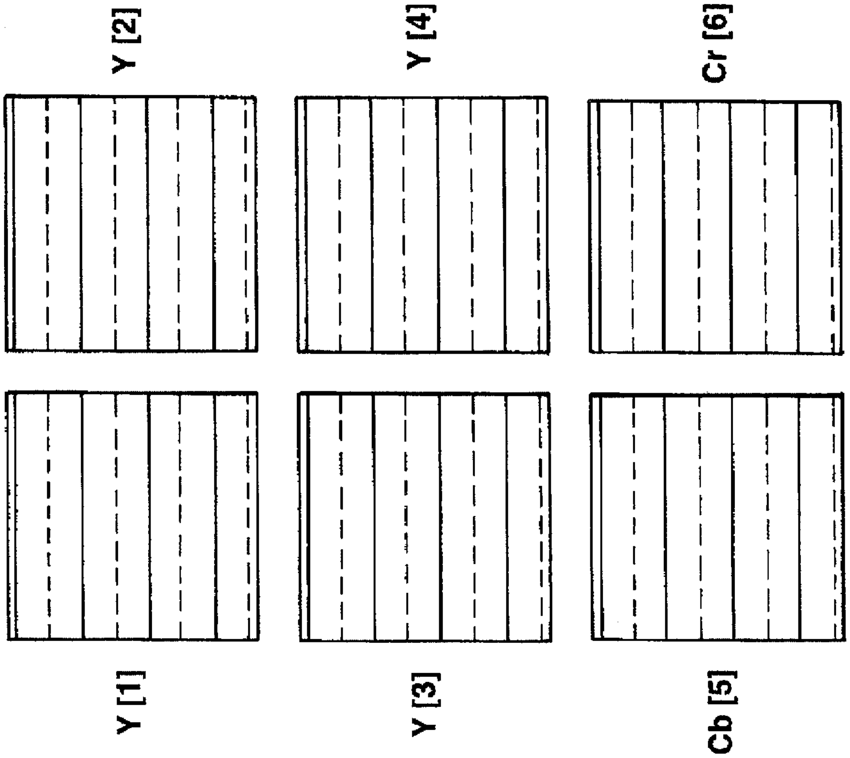

The schematic arrangement of the encoding apparatus for picture signals according to the present invention is similar to the conventional encoding apparatus shown in FIG. 16. However, the inverse quantization circuit 60 has one of the schematic arrangements shown in FIGS. 3, 6 and 7, while the quantization circuit 57 has a schematic arrangement shown in FIG. 8.

Figure 8:
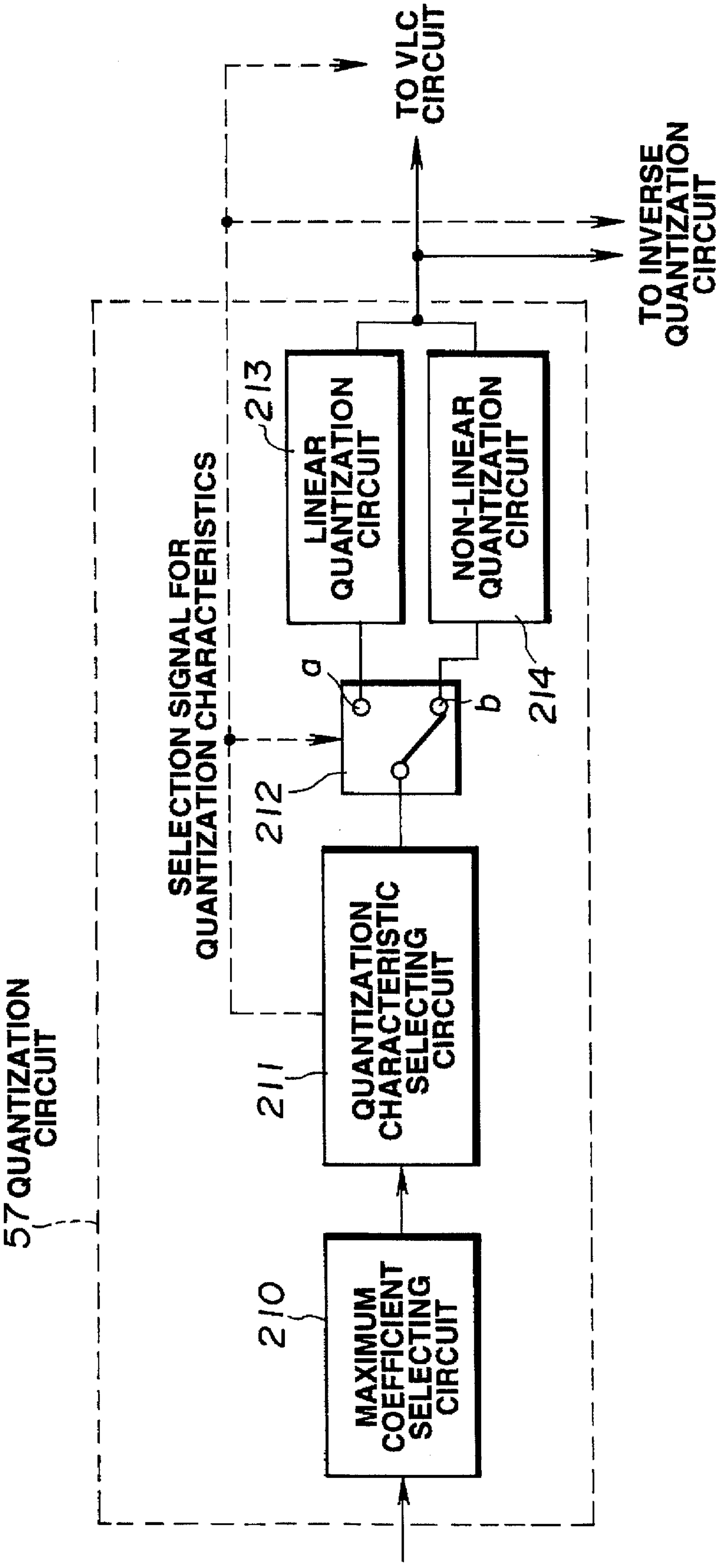
FIG. 8 illustrates a schematic arrangement of a quantization circuit within an encoding apparatus for picture signals according to the present invention.
Figure 9:
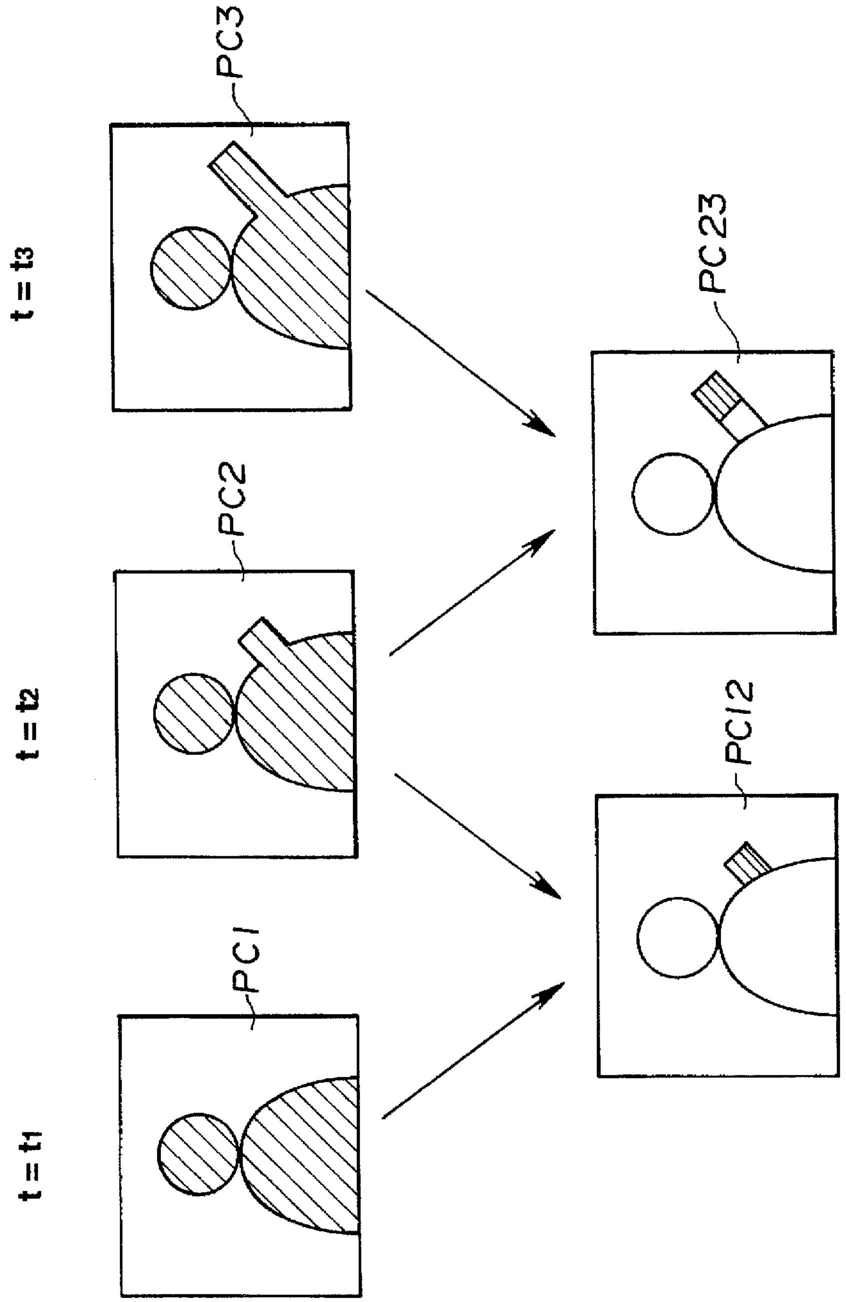
FIG. 9 illustrates the principle of high efficiency encoding.
Figure 10:
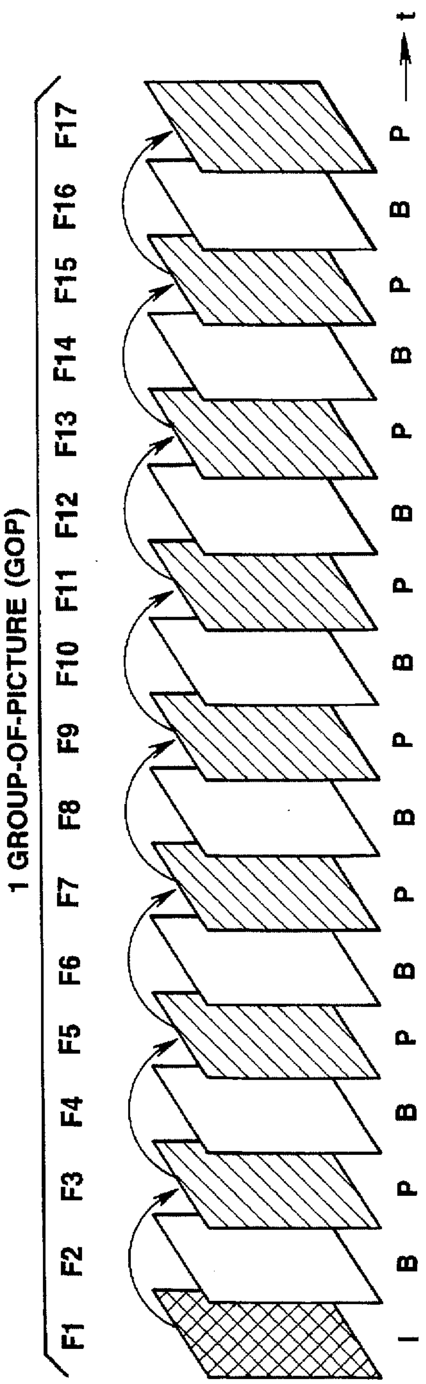
FIG. 10 illustrates picture type in compressing picture data.
Figure 10:
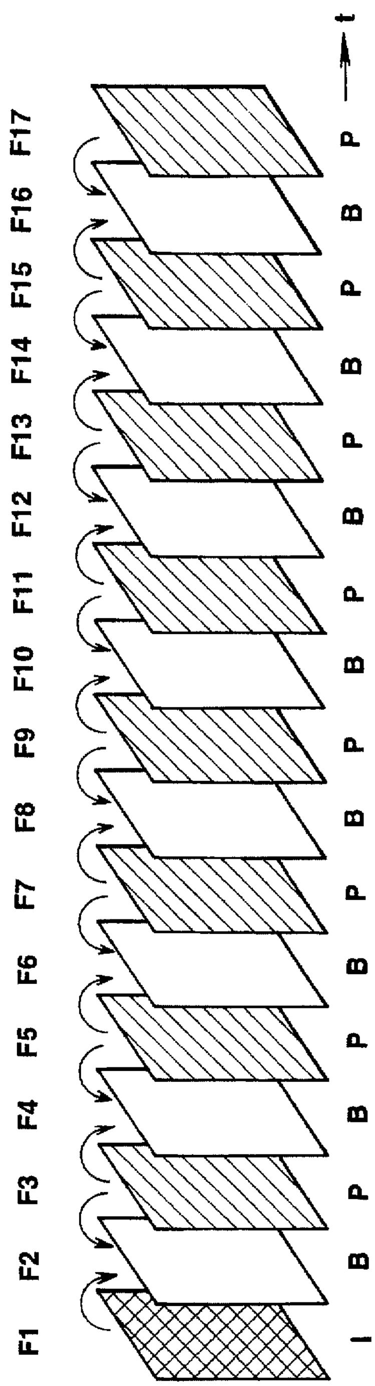
Figure 11:
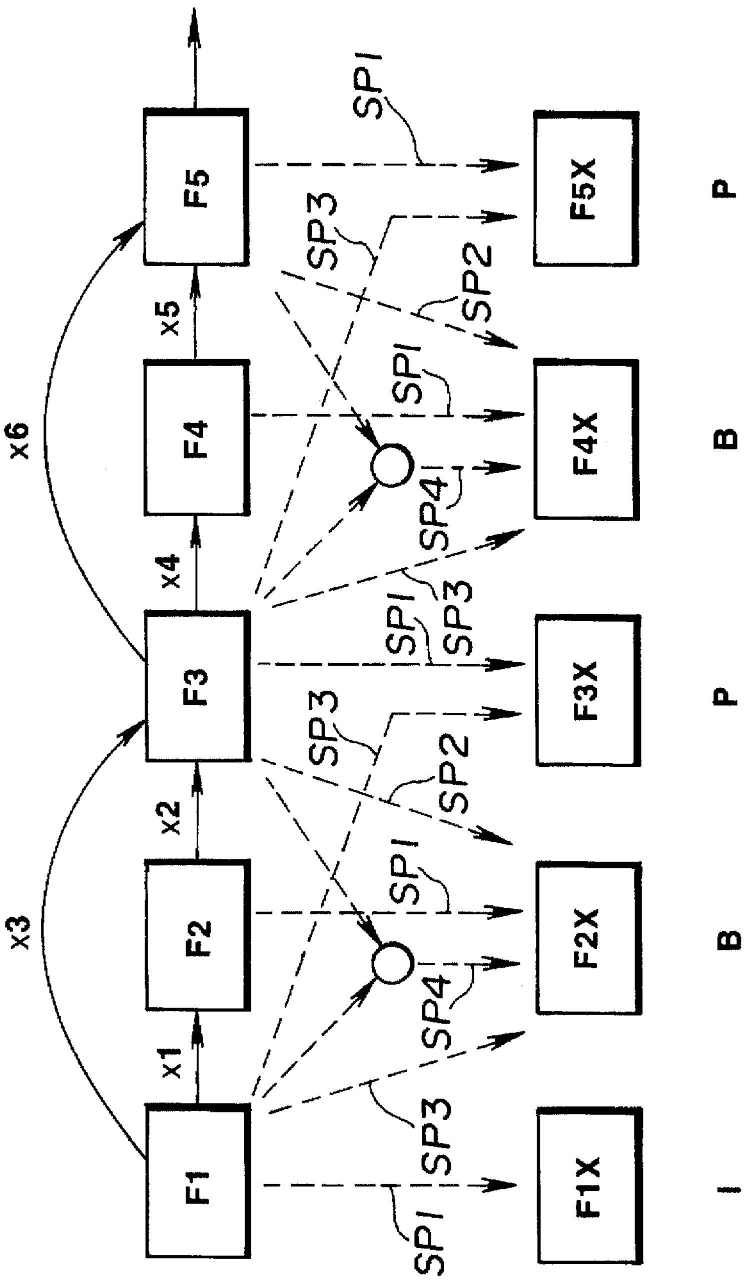
FIG. 11 illustrates the principle of encoding moving picture signals.
Figure 12:
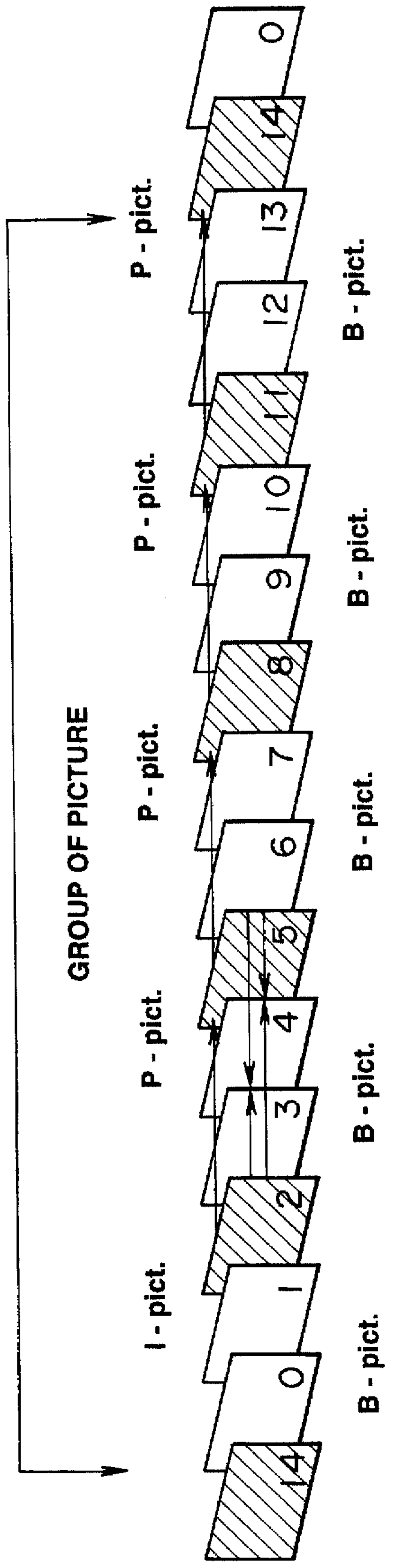
FIG. 12 illustrates a GOP structure for moving picture signals.
Figure 13:
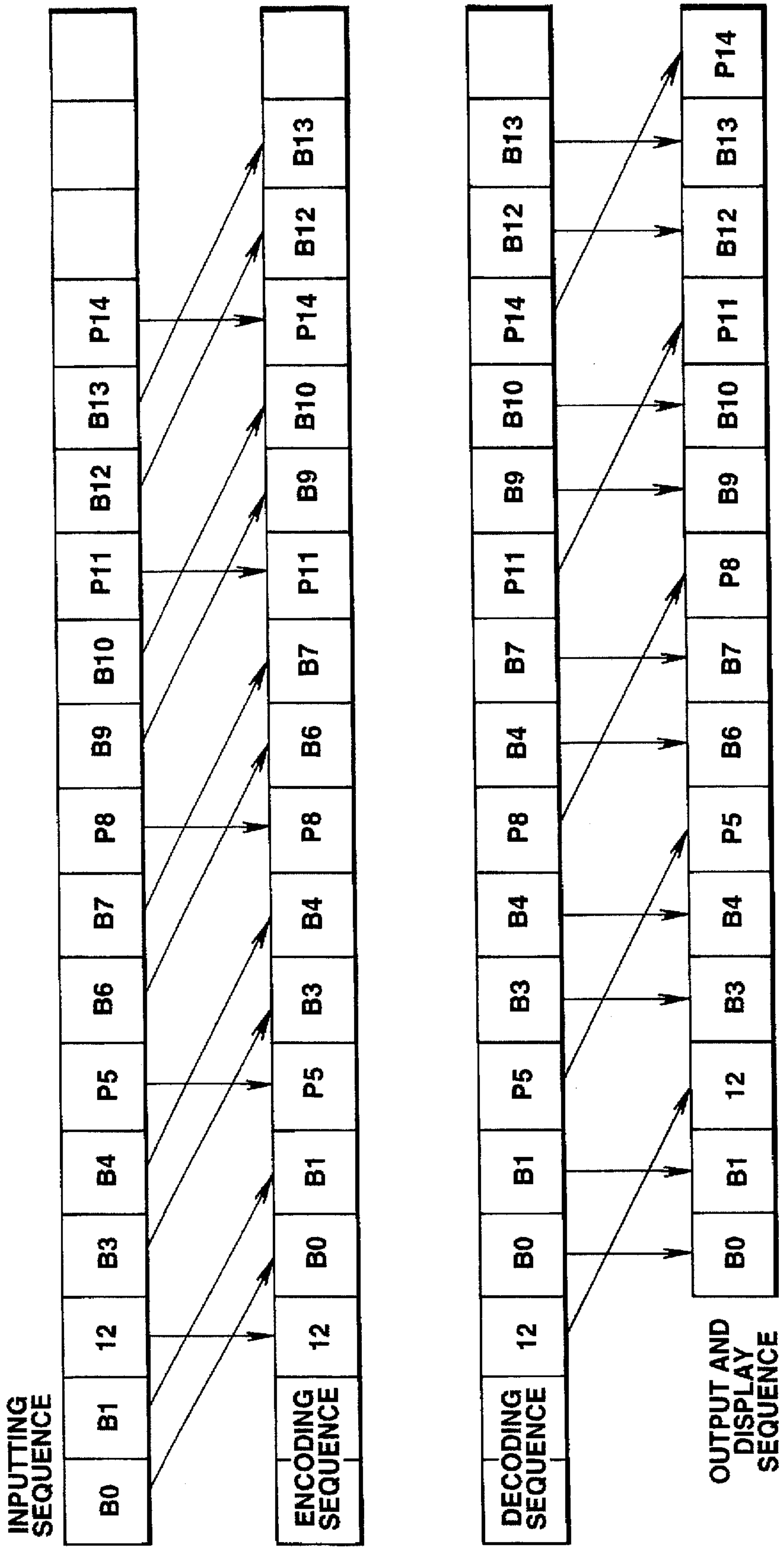
FIG. 13 illustrates the sequence of unpitying, encoding, decoding and outputting picture signals.
Figure 14:
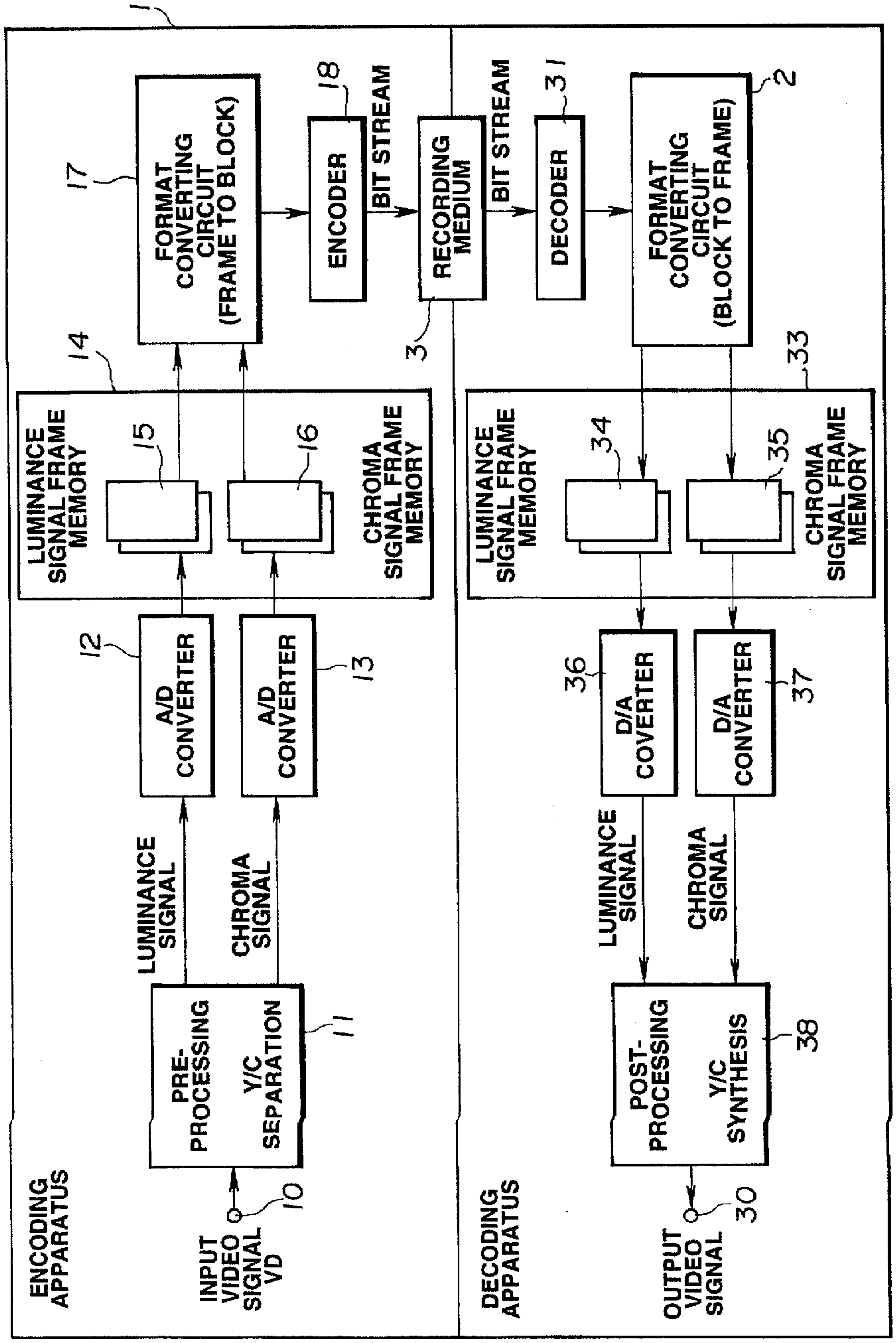
FIG. 14 is a block circuit diagram showing a typical structure of a conventional encoding/decoding apparatus.
Figure 15:
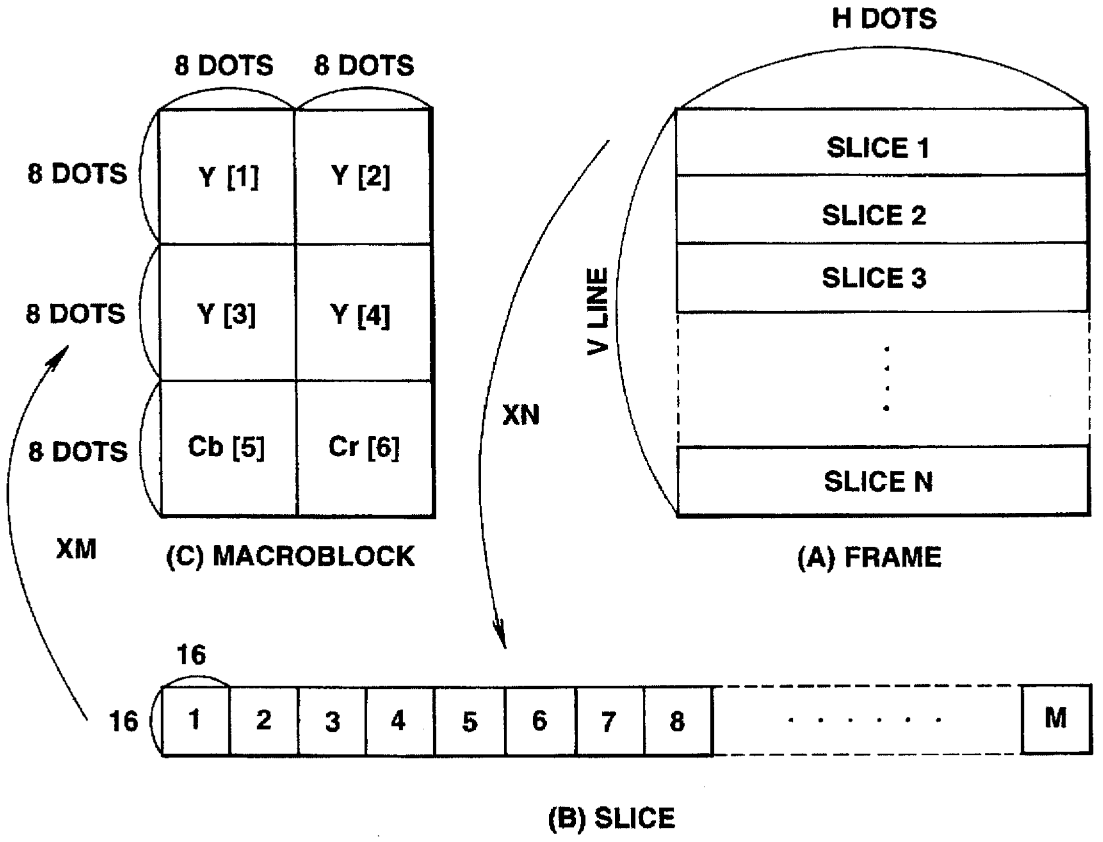
FIG. 15 illustrates the operation of format conversion in the format converting circuit 17 shown in FIG. 14.

The signals from the DCT circuit 56 shown in FIG. 16 are transmitted to the quantization circuit 57 shown in FIG. 8 and thereby to a maximum coefficient selecting circuit 210. In the maximum coefficient selecting circuit 210 a value obtained on dividing the maximum coefficient by the maximum quantization width (62) employed for linear quantization is compared to a maximum value of 256 of the quantization level. If the value is equal to or larger than the maximum quantization width, a quantization characteristic selecting circuit 211 selects the quantization characteristics for linear quantization. At this time, the quantization characteristic selecting circuit 211 outputs a quantization selecting signal, indicating that the linear quantization has been selected, to a signal changeover switch 212 and to the VLC circuit 58 shown in FIG. 16. Consequently, the signal changeover switch 212 is set to a fixed terminal a so that the output of the quantization characteristic selecting circuit 211 is transmitted via the terminal a of the signal changeover switch 212 to a linear quantization circuit 213. In the linear quantization circuit 213, linear quantization is performed on the data with the linear quantization characteristics and the resulting linear-quantized data is outputted to the VLC circuit 58 and to the inverse quantization circuit 60. The VLC circuit 58 then performs variable length coding using the quantization width (quantization stepsize).

However, if the value obtained at the maximum coefficient selecting circuit 210 and compared to the quantization level is found to be smaller than the maximum quantization width, the quantization characteristic selecting circuit 211 selects the quantization characteristics for non-linear quantization. Thus a quantization selecting signal from the quantization characteristic selecting circuit 211 indicating that non-linear quantization has been selected is outputted to the signal selecting switch 212 which is changed over to a fixed terminal b. An output of the quantization characteristic selecting circuit 211 is transmitted via the terminal b of the signal changeover switch 212 to a non-linear quantization circuit 214 via the terminal h of the signal changeover switch 212 so that non-linear quantization is performed in accordance with the non-linear quantization characteristics. The non-linear quantized data is outputted to the VLC circuit 58 and to the inverse quantization circuit 60. As With linear quantization, the VLC circuit 58 then performs variable length coding using the quantization width (quantization stepsize).

Since the linear quantization/non-linear quantization switching signal is changed over on the frame basis, the linear quantization is changed over to the non-linear quantization or vice versa on the frame basis.

It is also possible for the maximum coefficient selecting circuit 210 to check the flag indicating the quantization characteristics, prescribed in the MPEG system, to decide which of the linear quantization or the non-linear quantization is to be performed.

It is also possible for the maximum coefficient selecting circuit 210 to check the dynamic range to decide which of the linear quantization or the non-linear quantization is to be performed.

Figure 19:
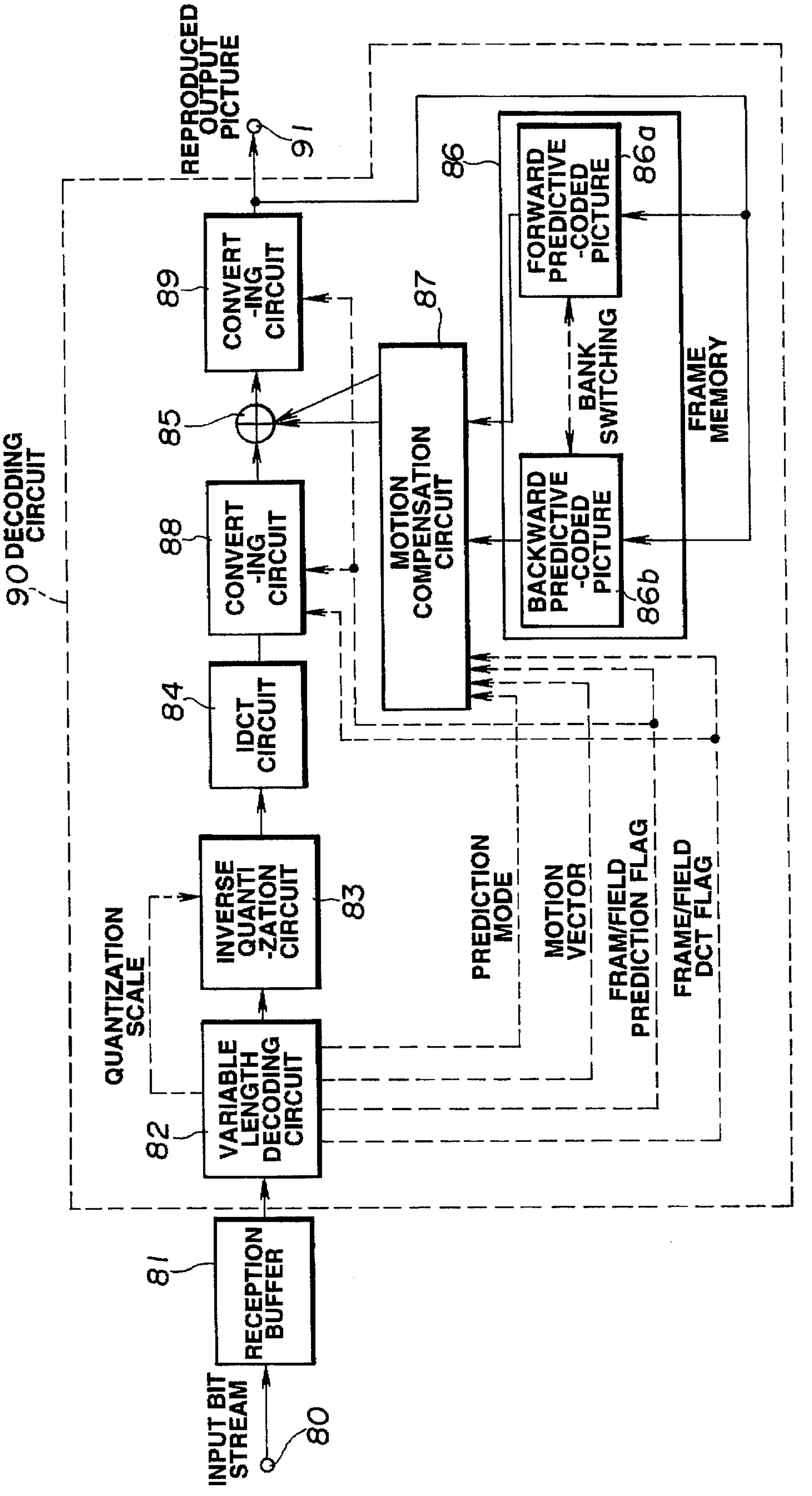
FIG. 19 is a block circuit diagram showing a typical structure of the decoder 31 shown in FIG. 14.
Figure 20:
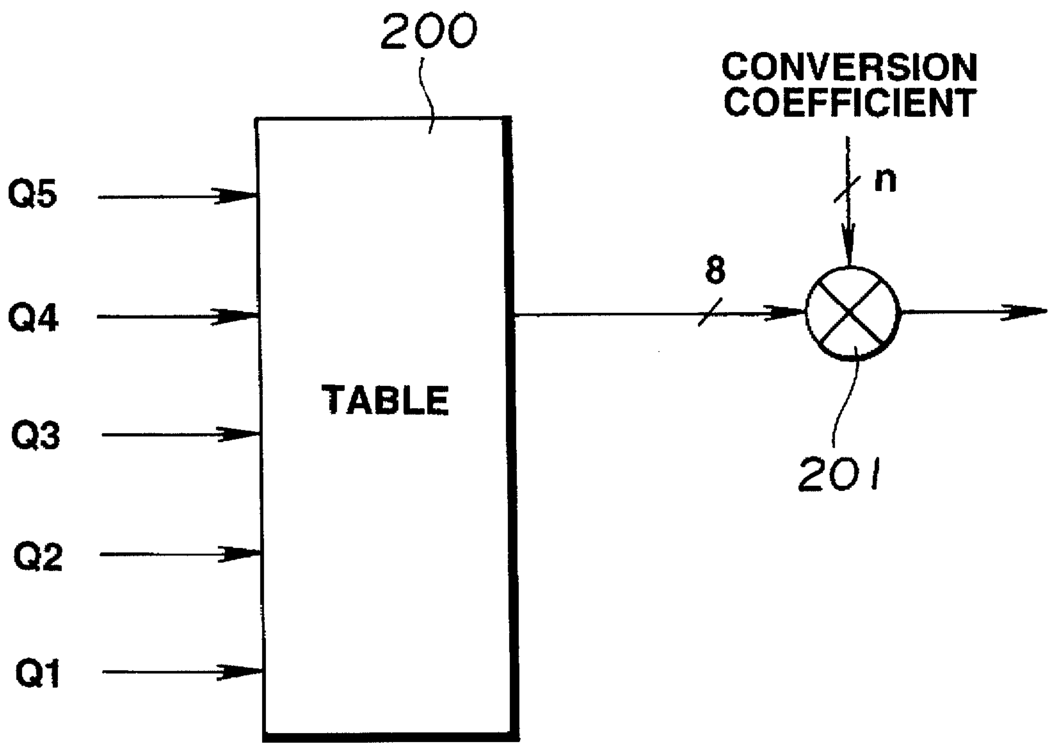
FIG. 20 illustrates a schematic arrangement of a conventional non-linear quantization circuit.

The schematic arrangement, of the decoding apparatus for picture signals according to the present invention is similar to that of the conventional decoding apparatus shown in FIG. 19. However, the inverse quantization circuit 83 may have any one of the schematic arrangements shown in FIGS. 3, 6 and 7.

It is to be noted that the above-described embodiments are merely illustrative and a latitude of changes and modification may be made without departing from the scope of the present invention.

We claim:

1. An encoding method for picture signals in which input picture signals are quantized and subsequently encoded, comprising setting a digital signal value representing a quantization information used for expressing an index of powers of 2 as a first quantization information among a set of quantization information, setting a digital signal value corresponding to a coefficient multiplied by the powers of 2 as representing a second quantization information among the set of quantization information, and quantizing the picture signals based on non-linear quantization characteristic signals (QUANT) obtained by using k as said first quantization information, k being a positive integer, and by using (i/2+j) as said second quantization information, j being a positive integer and i being 0 or 1, wherein said non-linear quantization characteristic signals (QUANT) are represented by an equation:

$$QUANT=(i/2+j)\times 2^{k}+2^{(k+2)}-4$$

and used as a width of quantization to produce quantized picture signals.

2. The picture signal encoding method as claimed in claim 1 wherein said set of quantization information comprising said first quantization information and said second quantization information is represented by five bits.

3. The picture signal encoding method as claimed in claim 2 wherein the relation between k, i and j and the non-linear quantization characteristic signals are as shown in the following Table 1:

TABLE 1

| index number | quantization information k | j | i | quantization characteristics decimal expression | binary expression |
|---|---|---|---|---|---|
| 0 | 00 | 00 | 0 | inhibit | inhibit |
| 1 | 00 | 00 | 1 | 0.5 | 00000.1 |
| 2 | 00 | 01 | 0 | 1.0 | 00001.0 |
| 3 | 00 | 01 | 1 | 1.5 | 00001.1 |
| 4 | 00 | 10 | 0 | 2.0 | 00010.0 |
| 5 | 00 | 10 | 1 | 2.5 | 00010.1 |
| 6 | 00 | 11 | 0 | 3.0 | 00011.0 |

TABLE 1-continued

| index | quantization | | | quantization characteristics | |
|---|---|---|---|---|---|
| | information | | | decimal | binary |
| number | k | j | i | expression | expression |
| 7 | 00 | 11 | 1 | 3.5 | 00011.1 |
| 8 | 01 | 00 | 0 | 4.0 | 000100. |
| 9 | 01 | 00 | 1 | 5.0 | 000101. |
| 10 | 01 | 01 | 0 | 6.0 | 000110. |
| 11 | 01 | 01 | 1 | 7.0 | 000111. |
| 12 | 01 | 10 | 0 | 8.0 | 001000. |
| 13 | 01 | 10 | 1 | 9.0 | 001001. |
| 14 | 01 | 11 | 0 | 10.0 | 001010. |
| 15 | 01 | 11 | 1 | 11.0 | 001011. |
| 16 | 10 | 00 | 0 | 12.0 | 001100. |
| 17 | 10 | 00 | 1 | 14.0 | 001110. |
| 18 | 10 | 01 | 0 | 16.0 | 010000. |
| 19 | 10 | 01 | 1 | 18.0 | 010010. |
| 20 | 10 | 10 | 0 | 20.0 | 010100. |
| 21 | 10 | 10 | 1 | 22.0 | 010110. |
| 22 | 10 | 11 | 0 | 24.0 | 011000. |
| 23 | 10 | 11 | 1 | 26.0 | 011010. |
| 24 | 11 | 00 | 0 | 28.0 | 011100. |
| 25 | 11 | 00 | 1 | 32.0 | 100000. |
| 26 | 11 | 01 | 0 | 36.0 | 100100. |
| 27 | 11 | 01 | 1 | 40.0 | 101000. |
| 28 | 11 | 10 | 0 | 44.0 | 101100. |
| 29 | 11 | 10 | 1 | 48.0 | 110000. |
| 30 | 11 | 11 | 0 | 52.0 | 110100. |
| 31 | 11 | 11 | 1 | 56.0 | 111000. |

4. The picture signal encoding method as claimed in claim 3 wherein, if said non-linear quantization characteristic signals (OUANT) are represented by a binary number, there exists at least one effective bit in four consecutive bits.

5. The picture signal encoding method as claimed in claim 2 wherein the relation between k, i, and j and the non-linear quantization characteristic signals are as shown in the following Table 2:

TABLE 2

| index | quantization | | | quantization characteristics | |
|---|---|---|---|---|---|
| | information | | | decimal | binary |
| number | k | j | i | expression | expression |
| 0 | 00 | 00 | 0 | inhibit | inhibit |
| 1 | 00 | 00 | 1 | 0.5 | 00000.1 |
| 2 | 00 | 01 | 0 | 1.0 | 00001.0 |
| 3 | 00 | 01 | 1 | 1.5 | 00001.1 |
| 4 | 00 | 10 | 0 | 2.0 | 00010.0 |
| 5 | 00 | 10 | 1 | 2.5 | 00010.1 |
| 6 | 00 | 11 | 0 | 3.0 | 00011.0 |
| 7 | 00 | 11 | 1 | 3.5 | 00011.1 |
| 8 | 01 | 00 | 0 | 4.0 | 000100. |
| 9 | 01 | 00 | 1 | 5.0 | 000101. |
| 10 | 01 | 01 | 0 | 6.0 | 000110. |
| 11 | 01 | 01 | 1 | 7.0 | 000111. |
| 12 | 01 | 10 | 0 | 8.0 | 001000. |
| 13 | 01 | 10 | 1 | 9.0 | 001001. |
| 14 | 01 | 11 | 0 | 10.0 | 001010. |
| 15 | 01 | 11 | 1 | 11.0 | 001011. |
| 16 | 10 | 00 | 0 | 12.0 | 001100. |
| 17 | 10 | 00 | 1 | 14.0 | 001110. |
| 18 | 10 | 01 | 0 | 16.0 | 010000. |
| 19 | 10 | 01 | 1 | 18.0 | 010010. |
| 20 | 10 | 10 | 0 | 20.0 | 010100. |
| 21 | 10 | 10 | 1 | 22.0 | 010110. |
| 22 | 10 | 11 | 0 | 24.0 | 011000. |
| 23 | 10 | 11 | 1 | 26.0 | 011010. |

TABLE 2-continued

| index | quantization | | | quantization characteristics | |
|---|---|---|---|---|---|
| | information | | | decimal | binary |
| number | k | j | i | expression | expression |
| 24 | 11 | 00 | 0 | 28.0 | 011100. |
| 25 | 11 | 00 | 1 | 36.0 | 100100. |
| 26 | 11 | 01 | 0 | 44.0 | 101100. |
| 27 | 11 | 01 | 1 | 52.0 | 110100. |
| 28 | 11 | 10 | 0 | 60.0 | 111100. |
| 29 | 11 | 10 | 1 | 68.0 | 1000100. |
| 30 | 11 | 11 | 0 | 76.0 | 1001100. |
| 31 | 11 | 11 | 1 | 84.0 | 1010100. |

6. The picture signal encoding method as claimed in claim 5 wherein there exists at least one effective bit in four consecutive bits.

7. A picture signal decoding method in which transmitted encoded data is inverse-quantized and subsequently decoded for restoring a picture from the encoded data, comprising the steps of reproducing non-linear quantization characteristic signals (QUANT) at the time of inverse quantization by multiplying powers of 2 by a coefficient, using a digital signal value for expressing an index of the powers of 2 as representing a first quantization information among a set of quantization information and a digital signal value corresponding to said coefficient as representing a second quantization information, and inverse guantizing data based on the reproduced non-linear quantization characteristic signals (QUANT) obtained by using k as said first quantization information and by using (i/2+j) as said second quantization information, j and k being positive integers and i being 0 or 1, wherein said non-linear quantization characteristic signals (QUANT) are represented by an equation:

$$QUANT=(i/2+j)\times 2^{k}+2^{(k+2)}-4$$

and used as a width of quantization to reproduce quantized picture signals.

8. The picture signal decoding method as claimed in claim 7 wherein said set of quantization information comprising said first quantization information and said second quantization information is represented by five bits.

9. The picture signal decoding method as claimed in claim 8 wherein the relation between k, i and j and the non-linear quantization characteristic signals are as shown in the following Table 5:

TABLE 5

| index | quantization | | | quantization characteristics | |
|---|---|---|---|---|---|
| | information | | | decimal | binary |
| number | k | j | i | expression | expression |
| 0 | 00 | 00 | 0 | inhibit | inhibit |
| 1 | 00 | 00 | 1 | 0.5 | 00000.1 |
| 2 | 00 | 01 | 0 | 1.0 | 00001.0 |
| 3 | 00 | 01 | 1 | 1.5 | 00001.1 |
| 4 | 00 | 10 | 0 | 2.0 | 00010.0 |
| 5 | 00 | 10 | 1 | 2.5 | 00010.1 |
| 6 | 00 | 11 | 0 | 3.0 | 00011.0 |
| 7 | 00 | 11 | 1 | 3.5 | 00011.1 |
| 8 | 01 | 00 | 0 | 4.0 | 000100. |
| 9 | 01 | 00 | 1 | 5.0 | 000101. |
| 10 | 01 | 01 | 0 | 6.0 | 000110. |

TABLE 5-continued

| index | quantization information | | | quantization characteristics | |
|---|---|---|---|---|---|
| number | k | j | i | decimal expression | binary expression |
| 11 | 01 | 01 | 1 | 7.0 | 000111. |
| 12 | 01 | 10 | 0 | 8.0 | 001000. |
| 13 | 01 | 10 | 1 | 9.0 | 001001. |
| 14 | 01 | 11 | 0 | 10.0 | 001010. |
| 15 | 01 | 11 | 1 | 11.0 | 001011. |
| 16 | 10 | 00 | 0 | 12.0 | 001100. |
| 17 | 10 | 00 | 1 | 14.0 | 001110. |
| 18 | 10 | 01 | 0 | 16.0 | 010000. |
| 19 | 10 | 01 | 1 | 18.0 | 010010. |
| 20 | 10 | 10 | 0 | 20.0 | 010100. |
| 21 | 10 | 10 | 1 | 22.0 | 010110. |
| 22 | 10 | 11 | 0 | 24.0 | 011000. |
| 23 | 10 | 11 | 1 | 26.0 | 011010. |
| 24 | 11 | 00 | 0 | 28.0 | 011100. |
| 25 | 11 | 00 | 1 | 36.0 | 100100. |
| 26 | 11 | 01 | 0 | 44.0 | 101100. |
| 27 | 11 | 01 | 1 | 52.0 | 110100. |
| 28 | 11 | 10 | 0 | 60.0 | 111100. |
| 29 | 11 | 10 | 1 | 68.0 | 1000100. |
| 30 | 11 | 11 | 0 | 76.0 | 1001100. |
| 31 | 11 | 11 | 1 | 84.0 | 1010100. |

10. The picture signal decoding method as claimed in claim 8 wherein, in inverse-quantizing the encoded data, the encoded data is multiplied in a three stage adder and a resulting sum is shifted by a number of bits determined by said first quantization information.

11. The picture signal decoding method as claimed in claim 8 wherein the relation between information k, i and j and the non-linear quantization characteristic signals are set as shown in the following Table 4:

TABLE 4

| index | quantization information | | | quantization characteristics | |
|---|---|---|---|---|---|
| number | k | j | i | decimal expression | binary expression |
| 0 | 00 | 00 | 0 | inhibit | inhibit |
| 1 | 00 | 00 | 1 | 0.5 | 00000.1 |
| 2 | 00 | 01 | 0 | 1.0 | 00001.0 |
| 3 | 00 | 01 | 1 | 1.5 | 00001.1 |
| 4 | 00 | 10 | 0 | 2.0 | 00010.0 |
| 5 | 00 | 10 | 1 | 2.5 | 00010.1 |
| 6 | 00 | 11 | 0 | 3.0 | 00011.0 |
| 7 | 00 | 11 | 1 | 3.5 | 00011.1 |
| 8 | 01 | 00 | 0 | 4.0 | 000100. |
| 9 | 01 | 00 | 1 | 5.0 | 000101. |
| 10 | 01 | 01 | 0 | 6.0 | 000110. |
| 11 | 01 | 01 | 1 | 7.0 | 000111. |
| 12 | 01 | 10 | 0 | 8.0 | 001000. |
| 13 | 01 | 10 | 1 | 9.0 | 001001. |
| 14 | 01 | 11 | 0 | 10.0 | 001010. |
| 15 | 01 | 11 | 1 | 11.0 | 001011. |
| 16 | 10 | 00 | 0 | 12.0 | 001100. |
| 17 | 10 | 00 | 1 | 14.0 | 001110. |
| 18 | 10 | 01 | 0 | 16.0 | 010000. |
| 19 | 10 | 01 | 1 | 18.0 | 010010. |
| 20 | 10 | 10 | 0 | 20.0 | 010100. |
| 21 | 10 | 10 | 1 | 22.0 | 010110. |
| 22 | 10 | 11 | 0 | 24.0 | 011000. |
| 23 | 10 | 11 | 1 | 26.0 | 011010. |
| 24 | 11 | 00 | 0 | 28.0 | 011100. |
| 25 | 11 | 00 | 1 | 32.0 | 100000. |
| 26 | 11 | 01 | 0 | 36.0 | 100100. |

TABLE 4-continued

| index | quantization information | | | quantization characteristics | |
|---|---|---|---|---|---|
| number | k | j | i | decimal expression | binary expression |
| 27 | 11 | 01 | 1 | 40.0 | 101000. |
| 28 | 11 | 10 | 0 | 44.0 | 101100. |
| 29 | 11 | 10 | 1 | 48.0 | 110000. |
| 30 | 11 | 11 | 0 | 52.0 | 110100. |
| 31 | 11 | 11 | 1 | 56.0 | 111000. |

12. An encoding apparatus for encoding picture signals in which input picture signals are quantized and subsequently encoded, comprising:

means for setting a digital signal value representing a quantization information used for expressing an index of powers of 2 as a first quantization information among a set of quantization information, means for setting a digital signal value corresponding to a coefficient multiplied by the powers of 2 as representing a second quantization information among the set of quantization information, and means for quantizing the picture signals based on non-linear quantization characteristic signals (QUANT) obtained by using k as said first quantization information, k being a positive integer, and by using (i/2+j) as said second quantization information, j being a positive integer and i being 0 or 1, wherein said non-linear quantization characteristic signals (QUANT) are represented by an equation:

$$QUANT=(i/2+j)\times 2^{k}+2^{(k+2)}-4$$

and used as a width of quantization to produce quantized picture signals.

13. A picture signal decoding apparatus in which transmitted encoded data is inverse-quantized and subsequently decoded for restoring a picture from coded data, comprising:

means for reproducing non-linear quantization characteristic signals (QUANT) at the time of inverse quantization by multiplying powers of 2 by a coefficient, using a digital signal value for expressing an index of the powers of 2 as representing a first quantization information among a set of quantization information and a digital signal value corresponding to said coefficient as representing a second quantization information, and means for inverse quantizing data based on the reproduced non-linear quantization characteristic signals (QUANT) obtained by using k as said first quantization information and by using (i/2+j) as said second quantization information, j and k being positive integers and i being 0 or 1, wherein said non-linear quantization characteristic signals (QUANT) are represented by an equation:

$$QUANT=(i/2+j)\times 2^{k}+2^{(k+2)}-4$$

and used as a width of quantization to reproduce quantized picture signals.

* * * * *